US012442083B2

(12) United States Patent
Zong et al.

(10) Patent No.: US 12,442,083 B2
(45) Date of Patent: Oct. 14, 2025

(54) ELECTRODE SUPPORT, SUPPORTING STRUCTURE, SUPPORT, FILM COATING APPARATUS, AND APPLICATION

(71) Applicant: JIANGSU FAVORED NANOTECHNOLOGY CO., LTD., Wuxi (CN)

(72) Inventors: Jian Zong, Wuxi (CN); Bixian Kang, Wuxi (CN); Fuxing Li, Wuxi (CN); Guoman Feng, Wuxi (CN)

(73) Assignee: JIANGSU FAVORED NANOTECHNOLOGY CO., LTD, Wuxi (CN)

( * ) Notice: Subject to any disclaimer, the term of this patent is extended or adjusted under 35 U.S.C. 154(b) by 632 days.

(21) Appl. No.: 17/782,168

(22) PCT Filed: Apr. 24, 2020

(86) PCT No.: PCT/CN2020/086525
§ 371 (c)(1),
(2) Date: Jun. 3, 2022

(87) PCT Pub. No.: WO2021/109424
PCT Pub. Date: Jun. 10, 2021

(65) Prior Publication Data
US 2023/0009866 A1 Jan. 12, 2023

(30) Foreign Application Priority Data

Dec. 4, 2019 (CN) .......................... 201911227637.3
Dec. 4, 2019 (CN) .......................... 201911228857.8
(Continued)

(51) Int. Cl.
*C23C 16/513* (2006.01)

(52) U.S. Cl.
CPC ................................ *C23C 16/513* (2013.01)

(58) Field of Classification Search
None
See application file for complete search history.

(56) References Cited

U.S. PATENT DOCUMENTS 4,287,851 A * 9/1981 Dozier .............. H01L 21/67326
118/721
4,289,598 A * 9/1981 Engle ..................... C23C 14/34
118/728

(Continued)

FOREIGN PATENT DOCUMENTS

CN      1397151      2/2003
CN      101845620      9/2010
(Continued)

OTHER PUBLICATIONS

English translation of International Search Report issued in International Patent Application No. PCT/CN2020/086525, dated Aug. 27, 2020.

*Primary Examiner* — Jethro M. Pence
(74) *Attorney, Agent, or Firm* — pH IP Law

(57) ABSTRACT

The present disclosure provides an electrode support, a supporting mechanism, a support, a film coating apparatus, and an application. The electrode support is applied to the film coating apparatus. The film coating apparatus allows coating of at least one to-be-coated workpiece. The film coating apparatus comprises a reaction chamber and a pulse power supply; the pulse power supply is used for providing a pulse electric field in the reaction chamber. The electrode support comprises support members arranged in multiple layers; the support member of each layer is separately retained at a preset spacing; at least one layer of the support member is conductively connected to the pulse power supply to serve as a negative electrode of the pulse power supply. The electrode support can uniformly load the to-be-coated workpiece and can be used as an electrode, and (Continued)

wiring between the electrode support and an external power supply is simple.

14 Claims, 14 Drawing Sheets

(30) Foreign Application Priority Data

| Dec. 4, 2019 | (CN) | .......................... 201922151677.6 |
| Dec. 4, 2019 | (CN) | .......................... 201922151761.8 |
| Dec. 4, 2019 | (CN) | .......................... 201922155324.3 |

(56) References Cited

U.S. PATENT DOCUMENTS

| 4,381,965 | A | * | 5/1983 | Maher, Jr. | ......... H01J 37/32568 |
| | | | | | 156/345.47 |
| 5,707,485 | A | * | 1/1998 | Rolfson | ............ H01J 37/32431 |
| | | | | | 156/345.55 |
| 6,245,189 | B1 | * | 6/2001 | Rigali | ............... H01L 21/67751 |
| | | | | | 118/723 R |
| 6,368,678 | B1 | | 4/2002 | Bluck et al. | |
| 6,749,729 | B1 | * | 6/2004 | Xu | .................... H01J 37/32577 |
| | | | | | 204/192.12 |
| 6,900,444 | B2 | * | 5/2005 | Ferrara | ............. H01L 21/68764 |
| | | | | | 250/281 |
| 7,455,735 | B2 | * | 11/2008 | Bolden, II | .......... C23C 16/4582 |
| | | | | | 156/345.31 |
| 8,166,914 | B2 | * | 5/2012 | Takahashi | ......... H01J 37/32779 |
| | | | | | 156/345.47 |
| 10,192,767 | B2 | * | 1/2019 | Benjamin | ......... H01J 37/32082 |
| 11,183,372 | B2 | * | 11/2021 | Kang | ....................... C23C 16/50 |
| 11,469,081 | B2 | * | 10/2022 | Sato | ....................... C23C 16/452 |
| 11,469,083 | B2 | * | 10/2022 | Sato | .................... H01J 37/32834 |
| 11,555,247 | B2 | * | 1/2023 | Zong | .................... H01L 21/68771 |
| 11,640,917 | B2 | * | 5/2023 | Rice | ................... H01L 21/68757 |
| | | | | | 361/234 |
| 11,749,510 | B2 | * | 9/2023 | Sato | ..................... C23C 16/4587 |
| | | | | | 438/798 |
| 11,967,490 | B2 | * | 4/2024 | Sato | ....................... C23C 16/509 |
| 2009/0239385 | A1 | | 9/2009 | Takahashi | |
| 2012/0142138 | A1 | * | 6/2012 | Li | ..................... H01J 37/32715 |
| | | | | | 438/57 |
| 2018/0197721 | A1 | * | 7/2018 | Swaminathan | ... H01J 37/32522 |
| 2020/0312632 | A1 | * | 10/2020 | Hara | ..................... C23C 16/4584 |
| 2021/0090861 | A1 | * | 3/2021 | Ishimaru | .................. C23C 16/50 |
| 2023/0018842 | A1 | * | 1/2023 | Jiangang | ........... H01L 21/67323 |
| 2023/0187180 | A1 | * | 6/2023 | Ejiri | .................. H01L 21/67109 |
| | | | | | 427/569 |

FOREIGN PATENT DOCUMENTS

| CN | 102804932 | | 11/2012 | |
| CN | 102804932 | A * | 11/2012 | ........... C23C 16/509 |
| CN | 103515486 | | 1/2014 | |
| CN | 206948696 | | 1/2018 | |
| CN | 108149217 | | 6/2018 | |
| CN | 207727149 | | 8/2018 | |
| CN | 110224627 | | 9/2019 | |
| CN | 110965049 | | 4/2020 | |
| CN | 110983296 | | 4/2020 | |
| EP | 2 549 840 | A1 | 1/2013 | |
| WO | WO 2011099205 | | 8/2011 | |

* cited by examiner

ELECTRODE SUPPORT, SUPPORTING STRUCTURE, SUPPORT, FILM COATING APPARATUS, AND APPLICATION

CROSS-REFERENCE TO RELATED APPLICATIONS

This application is a national phase application under 35 U.S.C. § 371 of International Application No. PCT/CN2020/086525, filed Apr. 24, 2020, the entire contents of which are hereby incorporated by reference; and which claims the priority benefit of Chinese Patent Application Nos. 201911227637.3, filed Dec. 4, 2019; 201911228857.8, filed Dec. 4, 2019; 201922151677.6, filed Dec. 4, 2019; 201922151761.8, filed Dec. 4, 2019; 201922155324.3, filed Dec. 4, 2019.

TECHNICAL FIELD

The present disclosure relates to the field of surface treatment, and more particularly to an electrode support, a support structure, a support, a film coating apparatus and an application thereof.

BACKGROUND

Plasma assisted deposition, injection and surface modification are important means of material surface coating and modification. Because a low-pressure discharge process is in a non-equilibrium state, films that need to be formed at a high temperature can also be deposited at a low temperature, and properties of the films can be improved under this condition, thus the films with non-equilibrium chemical composition and various amorphous states can be deposited.

There are many ways of thin film preparation, mainly including chemical vapor deposition and physical vapor deposition. The chemical vapor deposition refers to a deposition process that uses a principle of chemical reaction to precipitate solid substances from gaseous substances and deposit them on a working surface to form a coating layer (Li Jingui, Xiao Dingquan, Modern Surface Engineering Design Manual, Beijing, National Defense Industry Press, 2000). The physical vapor deposition refers to a vapor deposition process in which at least one deposition element is atomized under a vacuum condition (Li Jingui, Xiao Dingquan, Modern Surface Engineering Design Manual, Beijing, National Defense Industry Press, 2000).

No matter what process is applied for film preparation, a uniformity of deposition thickness on a surface of a sample is one of important indexes for coating effect evaluation. In most current preparation environments, the sample needs to be kept in a reaction chamber and then in an electric field. A reaction gas is activated in the electric field and then deposited on the surface of the sample.

In a common film coating apparatus at present, a usual way is to set two large electrode plates as positive and negative electrodes respectively, and a discharge between the two electrode plates forms an electric field, so that the reaction gas can be deposited on the surface of the sample under an excitation and traction of the electric field. When there are a large number of to-be-coated samples, in order to save space, these samples may be stacked in a height direction, and the two electrode plates are correspondingly disposed in the height direction. This arrangement mode makes some samples close to the electrode plates and some samples away from the electrode plates. Obviously, this is not conducive to the uniformity of the film layer on the surface of the sample. If there are a large number of to-be-coated samples, the samples may be disposed horizontally, which requires an expansion of an area size of the electrode plates, so as to expand an area size of the whole reaction chamber, which is obviously not conducive to improving space utilization of the film coating apparatus.

SUMMARY

An advantage of the present disclosure is to provide an electrode support, a supporting structure, a support, a film coating apparatus and an application thereof, wherein the electrode support can uniformly carry a to-be-coated workpiece and can be used as an electrode.

Another advantage of the present disclosure is to provide an electrode support, a supporting structure, a support, a film coating apparatus and an application thereof, wherein the electrode support can be used as a cathode, and a wiring between the electrode support and an external power supply is relatively simple.

Another advantage of the present disclosure is to provide an electrode support, a supporting structure, a support, a film coating apparatus and an application thereof, wherein at least part of the electrode support can be used as an anode and at least part can be used as a cathode.

Another advantage of the present disclosure is to provide an electrode support, a supporting structure, a support, a film coating apparatus and an application thereof, wherein the electrode support includes a plurality of layers of support members, and a polarity of the plurality of layers of support members can be easily changed according to needs.

Another advantage of the present disclosure is to provide an electrode support, a supporting structure, a support, a film coating apparatus and an application thereof, wherein the electrode support can also be used for gas supply.

Another advantage of the present disclosure is to provide an electrode support, a supporting structure, a support, a film coating apparatus and an application thereof, wherein the support structure can be used as an electrode and can also support the to-be-coated workpiece.

Another advantage of the present disclosure is to provide an electrode support, a supporting structure, a support, a film coating apparatus and an application thereof, wherein the support structure can be disposed in multiple layers in a height direction to accommodate more to-be-coated workpieces.

Another advantage of the present disclosure is to provide an electrode support, a supporting structure, a support, a film coating apparatus and an application thereof, wherein the support structure can support the to-be-coated workpiece in a fixed position, which is conducive to maintaining the to-be-coated workpiece in a stable position.

Another advantage of the present disclosure is to provide an electrode support, a supporting structure, a support, a film coating apparatus and an application thereof, wherein the support structure can guide a feed gas while playing a supporting role.

Another advantage of the present disclosure is to provide an electrode support, a supporting structure, a support, a film coating apparatus and an application thereof, wherein the support structure includes a plurality of support members disposed alternately, and the plurality of support members disposed alternately form a plurality of gas vents to facilitate flow and diffusion of the gas on opposite sides of the support structure.

Another advantage of the present disclosure is to provide an electrode support, a supporting structure, a support, a film coating apparatus and an application thereof, wherein the support structure has a mesh structure, which is conducive to reducing the weight of the whole support.

Another advantage of the present disclosure is to provide an electrode support, a supporting structure, a support, a film coating apparatus and an application thereof, wherein at least part of the support structure can be used as an electrode, and the at least part of the support structure can support the to-be-coated workpiece.

Another advantage of the present disclosure is to provide an electrode support, a supporting structure, a support, a film coating apparatus and an application thereof, wherein the support structure includes a plate body and at least one electrode member, the electrode member is disposed on the plate body and can be used as an electrode, and the plate body can play a supporting role.

Another advantage of the present disclosure is to provide an electrode support, a supporting structure, a support, a film coating apparatus and an application thereof, wherein the electrode member includes a plurality of electrode members disposed alternately, and the plurality of electrode members disposed alternately form a plurality of gas vents to facilitate the flow and diffusion of the gas on opposite sides of the support structure.

Another advantage of the present disclosure is to provide an electrode support, a supporting structure, a support, a film coating apparatus and an application thereof, wherein at least part of the support structure has a mesh structure, which is conducive to reducing the weight of the whole support.

Another advantage of the present disclosure is to provide an electrode support, a supporting structure, a support, a film coating apparatus and an application thereof, wherein the support member can support the to-be-coated workpiece at a lower position of the plate body to separate an adjacent to-be-coated workpiece, so as to reduce mutual interference of the to-be-coated workpieces.

According to one aspect of the present disclosure, the present disclosure provides an electrode support, configured for a film coating apparatus for forming a coating on at least one to-be-coated workpiece, wherein the film coating apparatus includes a reaction chamber body and a pulse power supply, and the pulse power supply is configured to provide a pulse electric field in the reaction chamber body; and wherein the electrode support includes a plurality of support members disposed in multiple layers and spaced apart by a preset spacing, and at least one layer of support member is conductively coupled with the pulse power supply as a cathode of the pulse power supply. The at least one layer of support member may comprise a support top plate and a support bottom plate, there is a space between the support top plate and the support bottom plate, and the support bottom plate may have at least one gas distribution opening.

According to another aspect of the present disclosure, the present disclosure provides a support structure, configured for a film coating apparatus and for supporting at least one to-be-coated workpiece, wherein the film coating apparatus includes a reaction chamber body and a reaction chamber, the support structure is accommodated in the reaction chamber and supported on the reaction chamber body, and the support structure is conductively coupled with a discharge device of the film coating apparatus as an electrode for discharging.

According to another aspect of the present disclosure, the present disclosure provides a support, configured for a film coating apparatus and for supporting at least one to-be-coated workpiece, wherein the film coating apparatus includes a reaction chamber body having a reaction chamber, and the support is accommodated in the reaction chamber; wherein the support includes: a plurality of support structures; and at least one connecting member for supporting the plurality of support structures in the reaction chamber body of the film coating apparatus, the plurality of support structures are disposed on the connecting member layer by layer at intervals, and the plurality of support structures are conductively coupled with a discharge device of the film coating apparatus as an electrode for discharging.

According to another aspect of the present disclosure, the present disclosure provides a film coating apparatus for coating at least one to-be-coated workpiece, including: a reaction chamber body having a reaction chamber; a discharge device for providing an electric field to the reaction chamber; a gas supply part for supplying a gas to the reaction chamber; and a support disposed in the reaction chamber, wherein the support includes a plurality of support structures and at least one connecting member for supporting the plurality of support structures in the reaction chamber body of the film coating apparatus, the support structure is disposed on the connecting member layer by layer at intervals, and the support structure is conductively coupled with the discharge device of the film coating apparatus as an electrode for discharging; wherein the to-be-coated workpiece is supported on the support and coated in the reaction chamber by a chemical vapor deposition.

According to another aspect of the present disclosure, the present disclosure provides a film coating apparatus for coating at least one to-be-coated workpiece, including: a reaction chamber body having a reaction chamber; a discharge device for providing an electric field to the reaction chamber; and a support disposed in the reaction chamber, wherein the support includes at least one support structure accommodated in the reaction chamber and supported on the reaction chamber body, the at least one support structure is conductively coupled with the discharge device of the film coating apparatus as an electrode for discharging, and the to-be-coated workpiece is supported on the support and coated in the reaction chamber by a chemical vapor deposition.

According to another aspect of the present disclosure, the present disclosure provides a support, configured for a film coating apparatus, wherein the film coating apparatus includes a reaction chamber body having a reaction chamber; and wherein the support includes a plurality of support structures, and at least one of the plurality of support structures includes a plurality of support members and a plurality of gas vents, wherein the plurality of support members are disposed alternately to form the plurality of gas vents, and the plurality of support structures are disposed at intervals from each other in the reaction chamber, and at least one of the plurality of support structures is conductively coupled with a discharge device of the film coating apparatus as an electrode for discharging.

According to another aspect of the present disclosure, the present disclosure provides a film coating apparatus for forming a coating on at least one to-be-coated workpiece, including: a reaction chamber body having a reaction chamber; a discharge device for providing an electric field to the reaction chamber; a gas supply part for supplying a gas to the reaction chamber; and a support including a plurality of support structures, wherein at least one of the plurality of support structures includes a plurality of support members and a plurality of gas vents, the plurality of support members are disposed alternately to form the plurality of gas vents, and the plurality of support structures are disposed at intervals from each other in the reaction chamber, wherein at least one of the plurality of support structures is conductively coupled with a discharge device of the film coating apparatus as an electrode for discharging, and the to-be-coated workpiece is supported on the support and coated in the reaction chamber by a chemical vapor deposition.

According to another aspect of the present disclosure, the present disclosure provides a support structure, configured for a film coating apparatus and for supporting at least one to-be-coated workpiece, wherein the film coating apparatus includes a reaction chamber body and a reaction chamber, and the support structure is accommodated in the reaction chamber and supported on the reaction chamber body, wherein the support structure includes a plate body and at least one electrode member, the at least one electrode member is disposed on the plate body, and the at least one electrode member is conductively coupled with a discharge device of the film coating apparatus as an electrode for discharging.

According to another aspect of the present disclosure, the present disclosure provides a support, configured for a film coating apparatus and for supporting at least one to-be-coated workpiece, wherein the film coating apparatus includes a reaction chamber body having a reaction chamber; wherein the support includes: a plurality of support structures, wherein each support structure includes a plate body and at least one electrode member, the at least one electrode member is disposed on the plate body, and the at least one electrode member is conductively coupled with a discharge device of the film coating apparatus as an electrode for discharging.

According to another aspect of the present disclosure, the present disclosure provides a film coating apparatus for coating at least one to-be-coated workpiece, including: a reaction chamber body having a reaction chamber; a discharge device for providing an electric field to the reaction chamber; a gas supply part for supplying a gas to the reaction chamber; and a support including a plurality of support structures, wherein each support structure includes a plate body and at least one electrode member, the at least one electrode member is disposed on the plate body, and the at least one electrode member is conductively coupled with a discharge device of the film coating apparatus as an electrode for discharging; wherein the plurality of support structure are conductively coupled with the discharge device as an electrode for discharging, and the to-be-coated workpiece is supported on the plate body and coated in the reaction chamber by a chemical vapor deposition.

According to another aspect of the present disclosure, the present disclosure provides an operating method of an electrode support, including: conductively coupling at least one layer of support member of the electrode support with a pulse power supply to discharge around at least one to-be-coated workpiece to form a pulse electric field, wherein the support member is used as a cathode of the pulse electric field.

According to another aspect of the present disclosure, the present disclosure provides an operating method of an electrode support, including: conductively coupling at least one layer of support member of the electrode support with a pulse power supply to discharge around at least one to-be-coated workpiece to form a pulse electric field; and providing a gas through at least one layer of support member.

DETAILED DESCRIPTION

Figure 1:
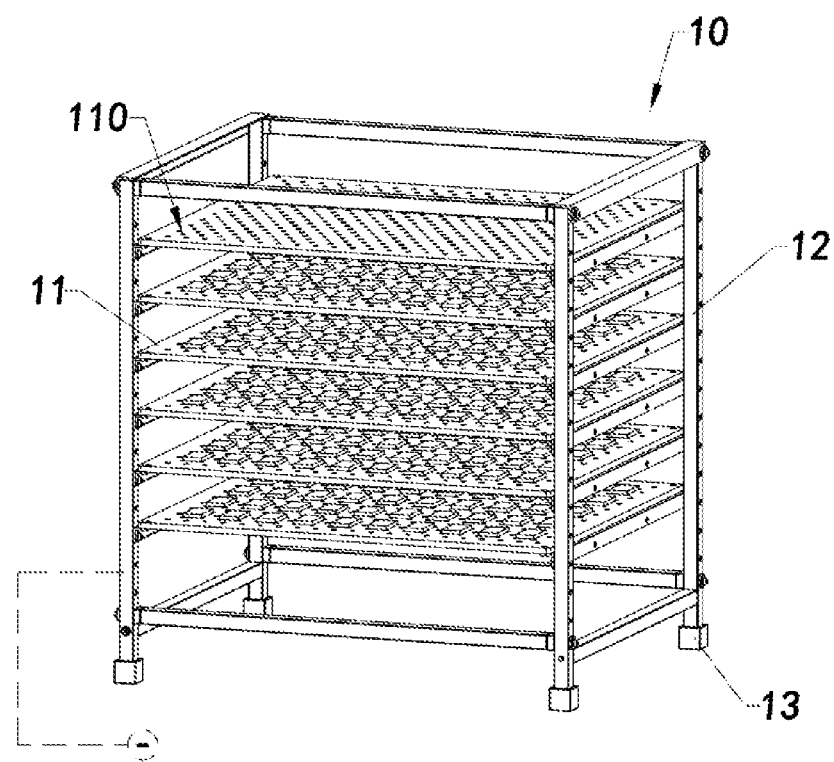
FIG. 1 is a schematic view of an electrode support according to a preferred embodiment of the present disclosure.

The following description is used to disclose the present disclosure in order to enable one skilled in the art to practice the disclosure. Preferred embodiments in the following description are given by way of example only, and other obvious variations will occur to those skilled in the art. The basic principles of the present disclosure defined in the following description can be applied to other embodiments, variations, modifications, equivalents, and other technical schemes without departing from the scope of the present disclosure.

It should be appreciated by those skilled in the art that, in the context of the present disclosure, terms "longitudinal", "lateral", "upper", "lower", "front", "back", "left", "right", "vertical", "horizontal", "top", "bottom", "inner", "outer" are based on orientation or positional relationships illustrated in the figures, which are merely for convenience in describing and simplifying the present disclosure, and do not indicate or imply that devices or components must have a particular orientation and be constructed and operated in a particular orientation, thus the above terms should not be construed as limiting the present disclosure.

It should be understood that the term "a" or "an" should be interpreted as "at least one" or "one or more", that is, in some embodiments, the number of one component may be one, and in other embodiments, the number of the component may be multiple, thus the term "a" and "an" should not be construed as limiting the number.

Referring to FIGS. 1 to 4, the present disclosure provides an electrode support 10 and a film coating apparatus 1. The film coating apparatus 1 can prepare various types of film layers, such as a diamond-like carbon (DLC) film. The film coating apparatus 1 forms a film layer through chemical deposition on a surface of a to-be-coated workpiece by using a plasma enhanced chemical vapor deposition (PECVD) technology. Specifically, the to-be-coated workpiece is placed in a reaction chamber body 20 of the film coating apparatus 1 for the plasma enhanced chemical vapor deposition so as to form the film layer on the surface of the to-be-coated workpiece.

The plasma enhanced chemical vapor deposition (PECVD) process has many advantages over other existing deposition processes: (1) Dry deposition does not need to use organic solvents; (2) An etching effect of the plasma on the surface of the substrate makes a deposited film have good adhesion with the substrate; (3) The film can be deposited evenly on the surface of an irregular substrate with strong vapor permeability; (4) The coating has good designability, and compared with a micron control accuracy of a liquid phase method, the chemical vapor phase method can control a thickness of the coating in nano scale; (5) The coating has simple structure, the chemical vapor method uses plasma activation, and does not need to design a specific initiator to initiate composite coatings of different materials, and a variety of raw materials can be combined through adjusting input energy; (6) Good compactness can be achieved, and the chemical vapor deposition method often activates multiple active sites in a process of plasma initiation, which is similar to the condition in which a molecule has multiple functional groups in solution reaction, and a cross-linked structure is formed between molecular chains through multiple functional groups; (7) As a coating treatment technology, it has excellent universality and wide selection range of coating objects and raw materials used for coating.

The electrode support 10 provided by the present disclosure can be used as an electrode of a radio frequency power supply or a pulse power supply. While supporting the to-be-coated workpiece, the electrode support 10 can provide a radio frequency electric field or a pulse electric field around the to-be-coated workpiece, which is conducive to providing a space utilization of a whole reaction chamber body 20.

Specifically, as shown in FIGS. 1 to 3A, the electrode support 10 includes a plurality of layers of support members 11, and the plurality of layers of support members 11 is disposed in a reaction chamber 200 of the reaction chamber body 20 of the film coating apparatus 1.

The to-be-coated workpiece can be placed in one or more layers of the plurality of layers of support members 11 of the electrode support 10.

The electrode support 10 includes at least one connecting member 12. The at least one connecting member 12 is disposed around the support members 11 to support each support member 11 at a preset height. A preset distance is maintained between two adjacent support members 11 for reactants to enter a space between the two adjacent support members 11, so as to deposit on the surface of the to-be-coated workpiece supported on the support members 11.

In some embodiments, the support members 11 have a rectangular shape. It should be understood by those skilled in the art that the shape of the support members 11 can be, but is not limited to, a triangle, a circle or other shapes. Optionally, the shape of the support members 11 is similar to a shape of a cross section formed by an inner wall of the reaction chamber body 20. On one hand, it is conducive to a utilization of a space of the reaction chamber 200, on the other hand, it is conducive to an equal distance between a circumference of the support members 11 and the inner wall of the reaction chamber body 20, so as to facilitate the uniformity of gas diffusion.

In some embodiments, there are four connecting members 12, which are disposed at four corners of the support members 11 to support the support members 11. Further, the connecting members 12 can be a post, which can be standing in the reaction chamber body 20. The posts may be made of stainless steel.

Further, the electrode support 10 is provided with at least one insulating member 13. The insulating member 13 is made of an insulating material, such as polytetrafluoroethylene. The insulating member 13 is arranged at a bottom end of the connecting member 12. When the entire electrode support 10 is accommodated in the reaction chamber body 20, the insulating member 13 can be supported on the reaction chamber body 20 so that the electrode support 10 and the reaction chamber body 20 cannot be connected.

It should be noted that in some embodiments, the electrode support 10 is supported on the reaction chamber body 20, and the insulating member 13 disposed at the bottom end of the connecting member 12 of the electrode support 10 is supported on the reaction chamber body 20.

In some embodiments of the present disclosure, the insulating member 13 may be disposed at other connection positions between the electrode support 10 and the reaction chamber body 20. For example, if the electrode support 10 is disposed in the reaction chamber of the reaction chamber body 20 by hanging, the insulating member 13 can be disposed on a top end of the connecting member 12. It can be understood by those skilled in the art that the setting position of the insulating member 13 can be changed based on the change of the installation position of the electrode support 10 and the reaction chamber body 20.

Further, in some embodiments, the entire electrode support 10 can be conductively coupled with the pulse power supply as the cathode of the pulse power supply.

Specifically, the film coating apparatus 1 includes the reaction chamber body 20 and a discharge device 30. The discharge device 30 can provide a pulse electric field and a radio frequency electric field to the reaction chamber of the reaction chamber body 20. The discharge device 30 includes the pulse power supply 31 for providing the pulse electric field and the radio frequency power supply 32 for providing the radio frequency electric field.

The radio frequency power supply 32 can provide the radio frequency electric field to the reaction chamber 20 in an electrode free manner. The pulse power supply 31 can be conductively coupled with the entire electrode support 10 to use the electrode support 10 as the cathode of the pulse power supply 31. It can be understood that at least part of the reaction chamber body 20 can be made of a conductive material so that at least part of the reaction chamber 20 can be used as an anode, such as being conductively coupled to the anode of the pulse power supply 31 or grounded so that there is a potential difference between the inner wall of the reaction chamber body 20 and the electrode support 10. Alternatively, the radio frequency power supply 32 is conductively coupled with the reaction chamber body 20 so that the reaction chamber body 20 acts as an anode to generate a potential difference with the electrode support 10 as a cathode of the pulse power supply 31.

When the to-be-coated workpiece is placed on any layer of the electrode support 10, the to-be-coated workpiece can be coated more quickly.

Specifically, the radio frequency power supply 32 and/or the pulse power supply 31 can discharge the raw material so that the whole reaction chamber 200 is in a plasma environment and the reaction gas is in a high-energy state. The pulse power supply 31 generates a strong electric field in the discharge process, and the strong electric field is close to the to-be-coated workpiece, so that active ions in the plasma environment are accelerated to deposit on the surface of the substrate under the action of the strong electric field.

When the surface of the workpiece needs to be coated with a DLC film, the reaction gas deposits on the surface of the to-be-coated workpiece under the action of the strong electric field to form an amorphous carbon network structure. When the pulse power supply 31 does not discharge, the amorphous carbon network structure is freely relaxed by using the film layer deposited on the to-be-coated workpiece. Under the action of thermodynamics, the carbon structure changes to a stable phase-curved graphene sheet structure, and is buried in the amorphous carbon network to form a transparent graphene-like structure.

In more detail, the support member 11 of the electrode support 10 as the cathode connected to the pulse power supply 31 is disposed below the to-be-coated workpiece. After the plasma is ionized under the action of the pulse electric field, positive ions in the plasma move towards the to-be-coated workpiece under the action of the pulse electric field to deposit on the surface of the to-be coated workpiece. The plasma includes a conductive gaseous medium with both electrons and positive ions.

It should be noted that since the electrode support 10 as the cathode is disposed around the to-be-coated workpiece, the positive ions in the plasma can be accelerated to deposit on the surface of the to-be-coated workpiece, which improves the coating speed of the to-be-coated workpiece on the one hand, and bombards the surface of the to-be-coated workpiece by the positive ions on the other hand, so as to enhance the strength of the film layer on the surface of the to-be-coated workpiece.

It should be noted that the gas injected into the reaction chamber body 20 can be reaction gas. Different reaction gases can be selected based on different requirements of the film layer. For example, when the film layer is a DLC film layer, the reaction gas can be CxHy, where x is an integer from 1 to 10 and Y is an integer from 1 to 20. The reaction gas can be a single gas or a mixed gas. Alternatively, the reaction gas may be methane, ethane, propane, butane, ethylene, acetylene, propylene or propyne in gaseous state under normal pressure, or vapor formed by decompression or heating evaporation. That is, the raw material that is liquid at room temperature can also be supplied to the reaction chamber 200 in a gaseous manner through the gas supply part.

The gas may be a plasma source gas, which includes but is not limited to inert gas, nitrogen and fluorocarbon compounds. For example, the inert gas includes but is not limited to helium or argon, and the fluorocarbon compounds includes but is not limited to carbon tetrafluoride. The plasma source gas can be a single gas or a mixture of two or more gases.

The gas can be an auxiliary gas, which can cooperate with the reaction gas to form a film layer to impart the film layer some expected characteristics, such as the strength and flexibility of the film layer. The auxiliary gas can be non-hydrocarbon gas, such as nitrogen, hydrogen, fluorocarbon gas, etc. The auxiliary gas can be supplied to the reaction chamber body 20 at the same time as the reaction gas, or can be introduced in order according to the demand.

The addition of the auxiliary gas can adjust the proportion of elements in the film layer, the proportion of hydrocarbon bond, carbon nitrogen bond and nitrogen hydrogen bond, so as to change the properties of the film layer.

Further, in some embodiments, both the support member 11 and the connecting member 12 are conductively coupled with the pulse power supply 31 of the discharge device 30. That is, both the support member 11 and the connecting member 12 are made of conductive materials.

It should be noted that since both the support member 11 and the connecting member 12 can be conductive, the support member 11 can be conductively coupled with the connecting member 12, or the support member 11 and the connecting member 12 can be conductively integrated with each other. The plurality of support members 11 can be connected with the pulse power supply 31 disposed outside the reaction chamber body 20.

In other words, the electrode support 10 and the pulse power supply 31 disposed outside the reaction chamber body 20 can be connected without complex wiring.

It should be noted that when the polarity of the support member 11 of the electrode support 10 needs to be changed, it is very convenient to directly change the connection between the connecting member 12 corresponding to the support member 11 and the discharge device 30.

Certainly, it should be understood that if one of the plurality of connecting members 12 is made of a conductive material, the conduction between the plurality of support members 11 and the connecting member 12 can be realized.

Further, the connecting member 12 may be hollow or solid. When the connecting member 12 is hollow, the wire can pass through the connecting member 12 so as not to be exposed.

Further, the connecting member 12 and the support member 11 are detachably connected with each other. When the to-be-coated workpiece changes, the support member 11 may need to be replaced, which is conducive to the replacement of the type of the support member 11 of the electrode support 10 or later maintenance.

In some embodiments of the present disclosure, each support member 11 may be made of a conductive material, the connecting member 12 may be made of an insulating material, and each support member 11 may be independently connected with the discharge device 30.

It should be noted that the support member 11 has a plurality of gas distribution openings 110. The plurality of gas distribution openings 110 are evenly arranged, and the gas passes through the gas distribution openings 110 of the support member 11 to facilitate the uniform distribution of the gas in the electrode support 10.

Alternatively, in some embodiments, the gas distribution openings 110 have a horn shape, especially an inverted horn shape.

A diameter of the gas distribution openings 110 ranges from about 2 mm to 3 mm, the length and width of the support members 11 ranges from 500 mm*500 mm to 600 mm*600 mm, and a spacing between adjacent support members 11 ranges from 10 mm to 200 mm.

Further, the film coating apparatus 1 further includes a suction device 40, a feeding device 50 and a control device 60. The suction device 40 and the feeding device 50 are respectively connected with the reaction chamber body 20, and the suction device 40, the feeding device 50 and the discharge device 30 are respectively connected with the control device 60. The control device 60 is configured to control a feed flow rate, a proportion, a pressure, a discharge size, a discharge frequency and other parameters in the reaction chamber body 20 to make the whole coating process controllable.

For example, the feeding device 50 can input $Ar/N_2/H_2/CH_4$ towards the reaction chamber body 20 at a flow rate of 50 to 500 sccm, and input $C_2H_2/O_2$ towards the reaction chamber body 20 at a flow rate of 10 to 200 sccm, and the suction device 40 can control the vacuum degree of the reaction chamber body 20 to be less than $2\times10^{-3}$ Pa before coating. After the coating starts, the coating vacuum of the reaction chamber body 20 can be maintained at 0.1 to 20 Pa.

During the coating process, the voltage generated by the discharge device 30 is -300 to -3500, the duty cycle is 5-100%, and the frequency is 20-360 khz. The coating time is about 0.1 hour to 5 hours. Finally, the thickness of the coating is not more than 50 nm. Of course, with the extension of the coating time, the thickness of the coating can become thicker.

It should be noted that a transparent film layer can be obtained through the film coating apparatus 1.

More specifically, in some embodiments of the present disclosure, an inorganic film layer, such as a diamond-like carbon film layer, can be obtained by using the film coating apparatus 1. For example, a flow of CxHy is 50 to 1000 sccm, a flow of inert gas is 10 to 200 sccm, a flow of $H_2$ is 0 to 100 sccm, a pressure of the vacuum reaction chamber 100 is 0.01 PA to 100 Pa, a radio frequency power is 10 to 800W, a bias power supply voltage is -100V to -5000v, a duty cycle is 10% to 80%, and a coating time is 5 to 300 min.

The flow ratio between different gases determines an atomic ratio of the DLC film layer and affects the quality of the film layer. The size of the power supply of the discharge device 30 determines the temperature rise, ionization rate, deposition rate and other relevant parameters of the ionization process. Too short coating time will cause a thinner film and poor hardness performance, and too long coating time will cause a thicker film and affect the transparency.

Figure 2:
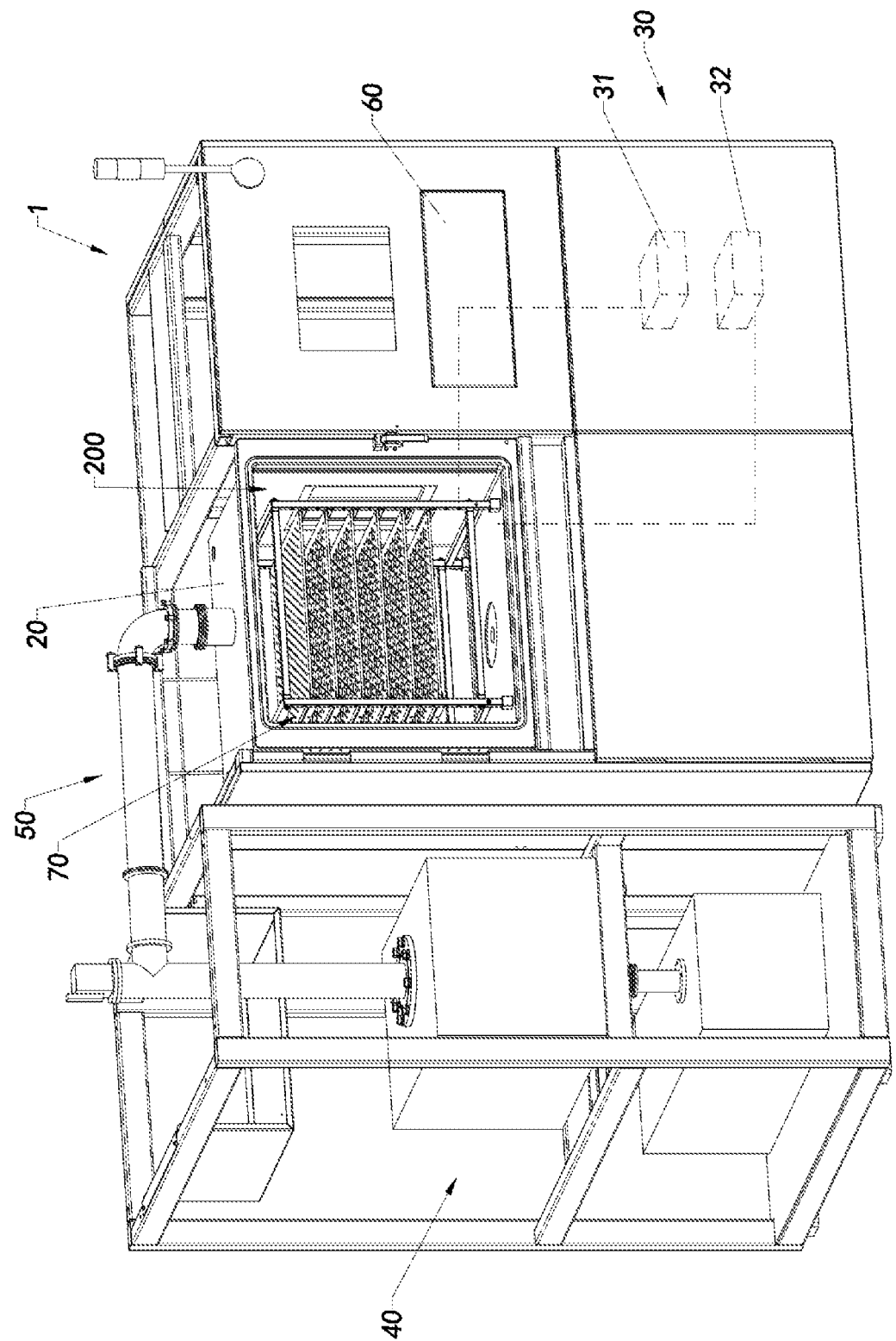
FIG. 2 is a schematic view of a film coating apparatus according to a preferred embodiment of the present disclosure.

Another embodiment of the electrode support 10 according to the above preferred embodiment of the present disclosure will be illustrated with reference to FG.3A and FIGS. 1 and 2.

The electrode support 10 includes a plurality of support members 11 disposed in multiple layers, and at least some of the support members 11 of the electrode support 10 are conductively coupled with the pulse power supply 31 as a cathode, and at least some of the support members 11 of the electrode support 10 are conductively coupled with the radio frequency power supply 32 as an anode. The to-be-coated workpiece can be placed on the support members 11 as the cathode.

Specifically, the electrode support 10 is respectively connected to the radio frequency power supply 32 and the pulse power supply 31 as an anode and a cathode, and the cathode and anode can be arranged alternately.

For example, when the electrode supports 10 are disposed in six layers, the support members 11 in the first, third and fifth layers can be used as an anode, the support members 11 in the second, fourth and sixth layers can be used as a cathode, and the to-be-coated workpiece can be placed on the support members 11 in the second, fourth and sixth layers.

A distance between the support member 11 in the first layer and the support member 11 in the second layer, a distance between the support member 11 in the third layer and the support member 11 in the fourth layer, and a distance between the support member 11 in the fifth layer and the support member 11 in the sixth layer may be the same, so as to create a similar environment for the support members 11 in different layers, in order to facilitate the uniformity of the coating of the to-be-coated workpiece.

Further, the support members 11 in the first layer, the third layer and the fifth layer as the anode are respectively connected with the radio frequency power supply 32, and the support members 11 in the second layer, the fourth layer and the sixth layer as the cathode are respectively connected with the pulse power supply 31.

Figure 3A:
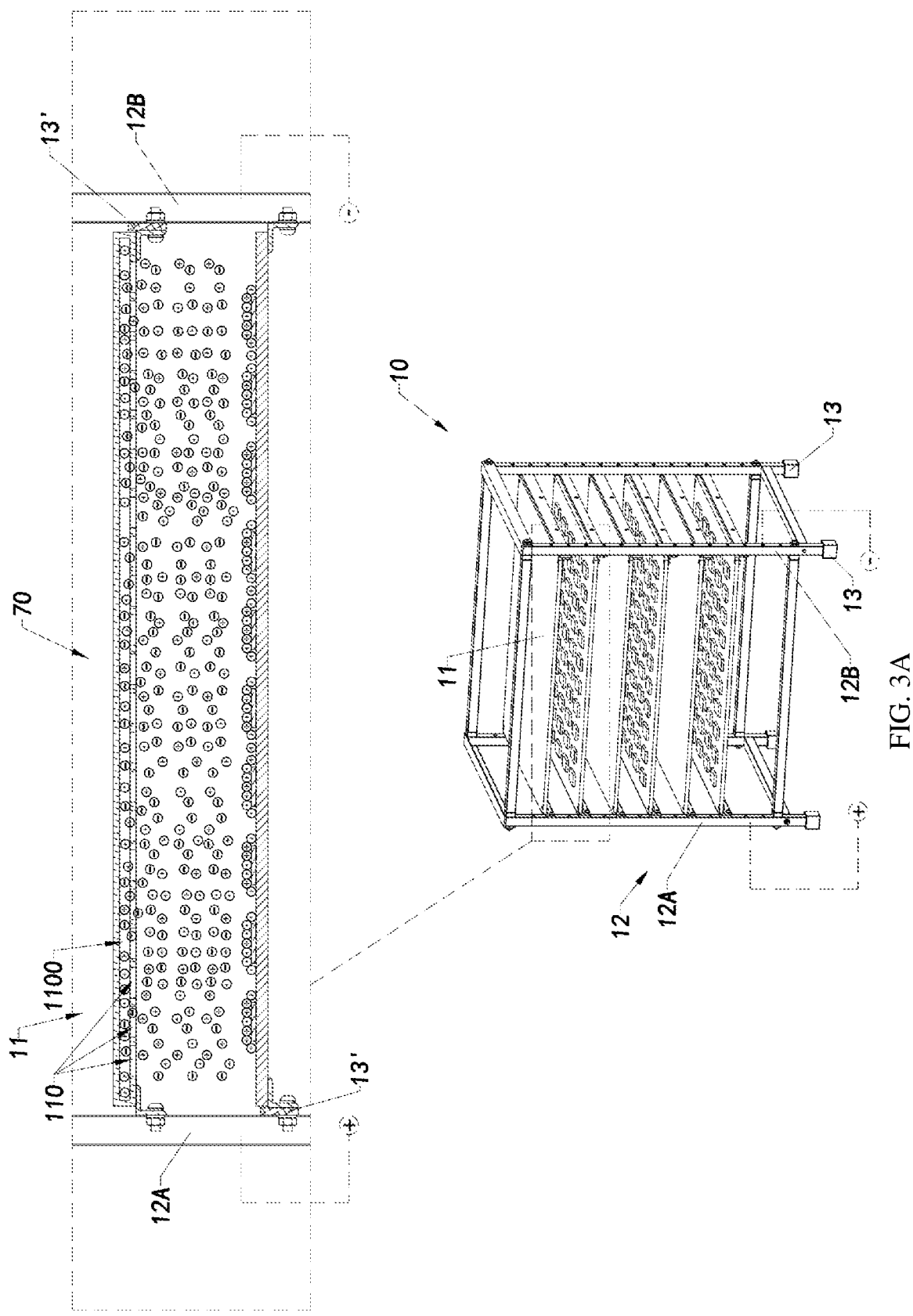
FIG. 3A is a schematic view of an electrode support according to another preferred embodiment of the present disclosure.
Figure 3B:
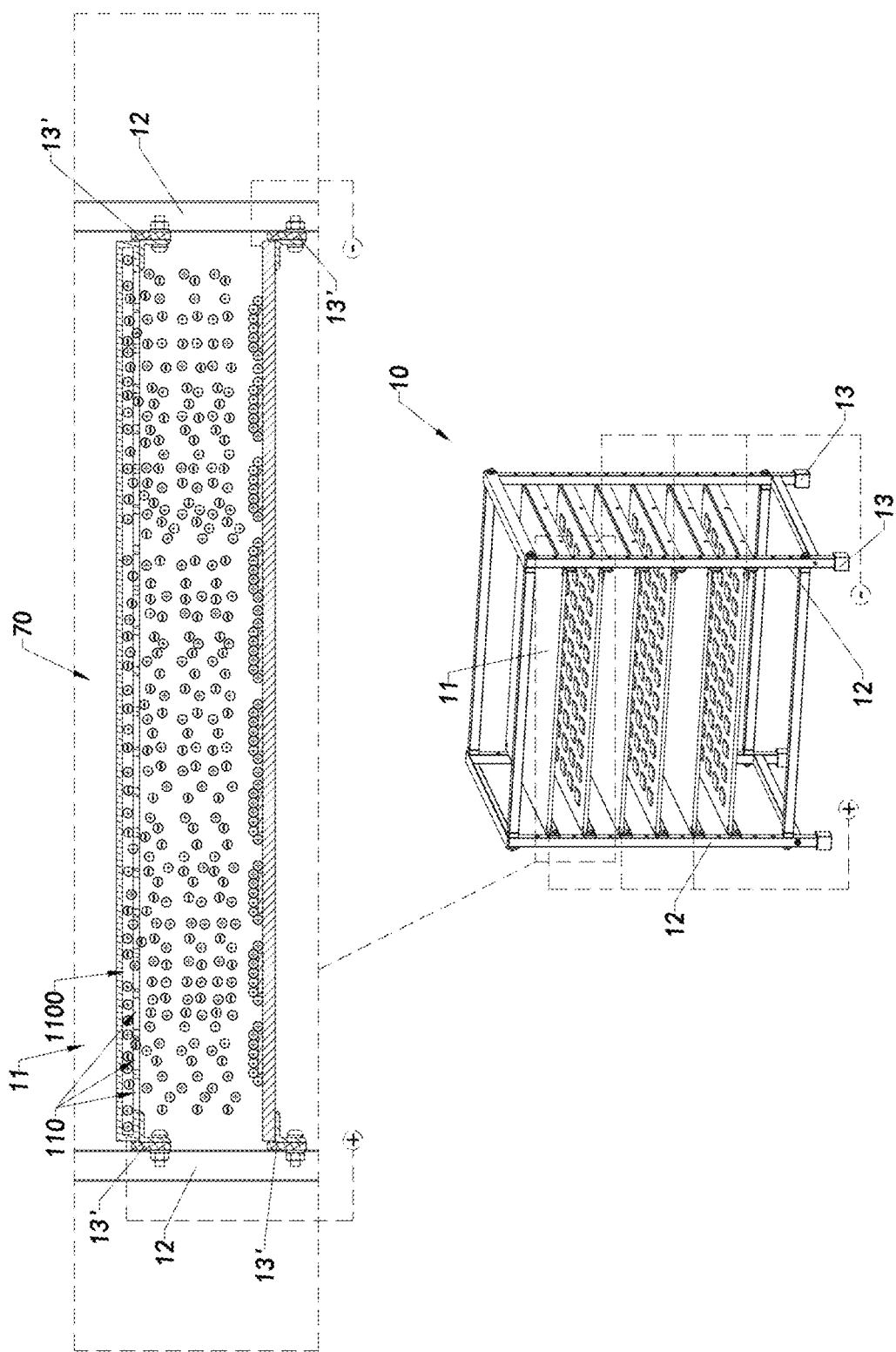
FIG. 3B is a schematic view of an electrode support according to another preferred embodiment of the present disclosure.

Alternatively, adjacent support members 11 connected with different power sources can be insulated from the connecting member 12 through an insulating member 13', that is, at least part of the connecting member 12 can be made of an insulating material so that the adjacent support members 11 can be insulated from each other. Each support member 11 may be independently connected with the pulse power supply 31 or the radio frequency power supply 32, as shown in FIG. 3B. The connecting member 12 may include at least two conductive parts and at least one insulating part, the insulating part isolates from the conductive parts, and the conductive parts are conductively coupled with the support member 11 in at least one layer.

In some embodiments, multiple layers of support members 11 as the anode are conductively coupled with one connecting member 12, and multiple layers of support member 11 as the cathode are conductively coupled with another connecting member 12. In order to show the difference, a connecting member 12A and a connecting member 12B are shown. The multiple layers of support members 11 as the anode are conductively coupled with the connecting member 12A, and the connecting member 12B and the multiple layers of support member 11 as the anode are insulated from each other. The multiple layers of support members 11 as the cathode are conductively coupled with the connecting member 12B, and the connecting member 12A and the multiple layers of support member 11 as a cathode are insulated from each other.

In this way, the connection between the electrode support 10 and the discharge device 30 becomes very simple, there is no need to carry out complex wiring for each support member 11, and the adverse impact of the complex connection between the support member 11 and the discharge device 30 on the coating environment can be avoided.

It should be noted that according to other embodiments of the present disclosure, when at least one layer of the multiple layers of support members 11 is connected with the pulse power supply 31 of the discharge device 30 as the cathode of the pulse power supply 31, the other layers of the multiple layers of support members 11 can be grounded or connected with the pulse power supply 31 as the anode of the pulse power supply 31.

It should be noted that the polarity of the support members 11 of the electrode support 10 can be changed as required. For example, the support member 11 in the second layer can be used as the cathode. When the user wants to change the polarity of the support member 11 to anode, it can be realized by changing the connection between the support member 11 in the second layer and the discharge device 30. The connection between the support members 11 of the electrode support 10 and the outside can also be changed very conveniently.

Since a plurality of support members 11 of the electrode support 10 can be connected to the outside through a unified connecting member 12, the connection between the support members 11 of the electrode support 10 and the outside can be easily changed. For example, the connecting member 12 is changed from being connected with the pulse power supply 31 to being connected with the radio frequency power supply 32.

Further, the film coating apparatus 1 includes a gas supply part 70. The gas supply part 70 is communicably connected with the feeding device 50, and the gas supply part 70 is disposed in the reaction chamber.

In some embodiments, the gas supply part 70 is disposed on the support member 11 as the anode. Specifically, the support member 11 forms a gas path 1100, the support member 11 has a plurality of gas distribution openings 110, and the gas distribution openings 110 are respectively communicated with the gas path 1100 so that the gas in the gas path 1100 can be transported to the gas distribution opening 110.

When the support member 11 as the anode is connected with the radio frequency power supply 32, at least part of the gas in the gas path 1100 can be ionized to generate plasma, and then leave the gas path 1100 from the position of the gas distribution opening 110. Under the action of the pulse power supply 31 applied to the support member 11 as the cathode, the positive ions in the plasma accelerate towards the support member 11 as the cathode, which is conducive to shortening the coating time and improving the coating strength. Then, the to-be-coated workpiece in the support member 11 as the cathode is coated.

Alternatively, the gas distribution opening 110 is evenly disposed on the support member 11 as the anode towards the support member 11 in the next layer.

For the whole electrode support 10, the gas distribution opening 110 can go deep into the interior of the electrode support 10, which is conducive to reducing the non-uniformity of the gas and improving the uniformity of coating.

It should be noted that the gas supply part 70 can also be disposed on the connecting member 12. When the connecting member 12 is a hollow post, the gas path 1100 can be formed inside the connecting member 12 and connected with the gas distribution opening 110 formed on the surface of the connecting member 12, so as to distribute the gas around the support member 11. With the arrangement of the connecting member 12 and the gas distribution opening 110 of the support member 11, the gas can be evenly distributed around the to-be-coated workpiece, which is conducive to the uniformity of subsequent coating.

Figure 4:
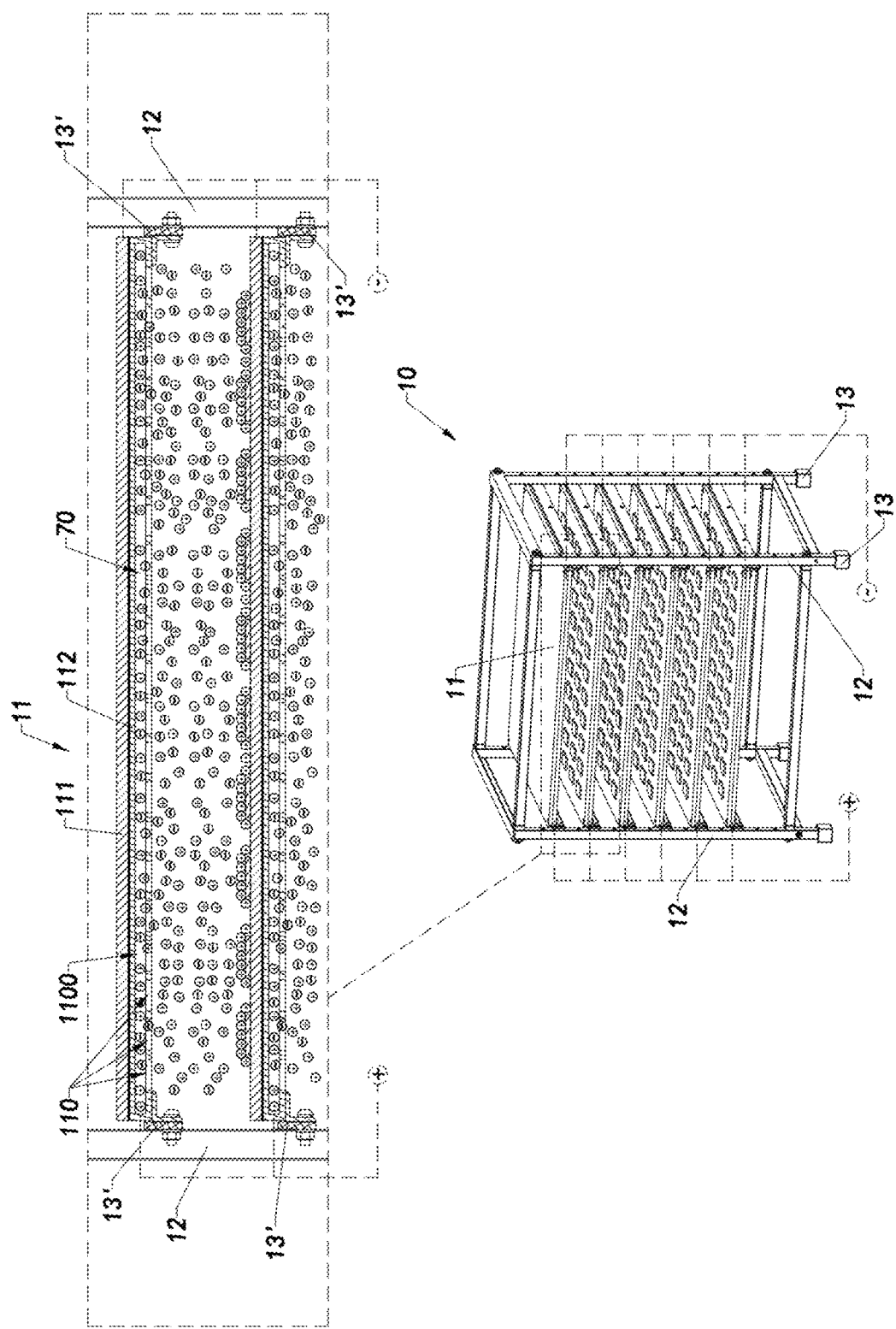
FIG. 4 is a schematic view of an electrode support according to another preferred embodiment of the present disclosure.
Figure 5:
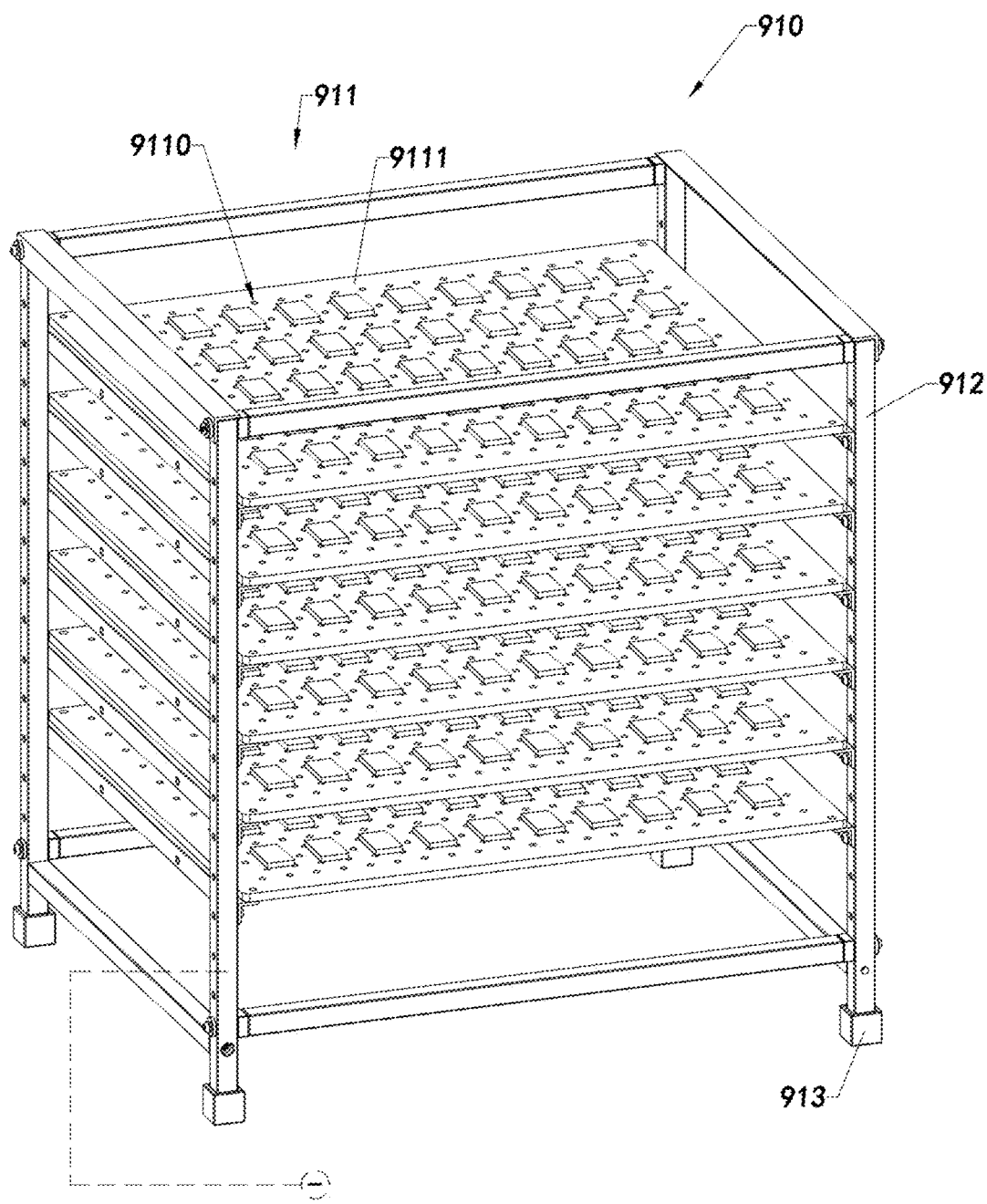
FIG. 5 is a schematic view of a support according to a preferred embodiment of the present disclosure.
Figure 6A:
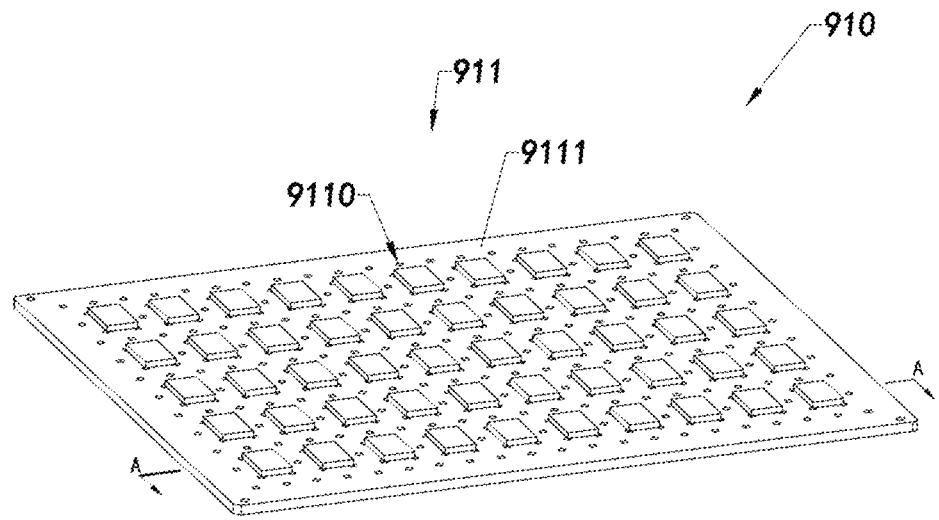
FIG. 6A is a schematic view of a plate structure of a support according to a preferred embodiment of the present disclosure.
Figure 6B:
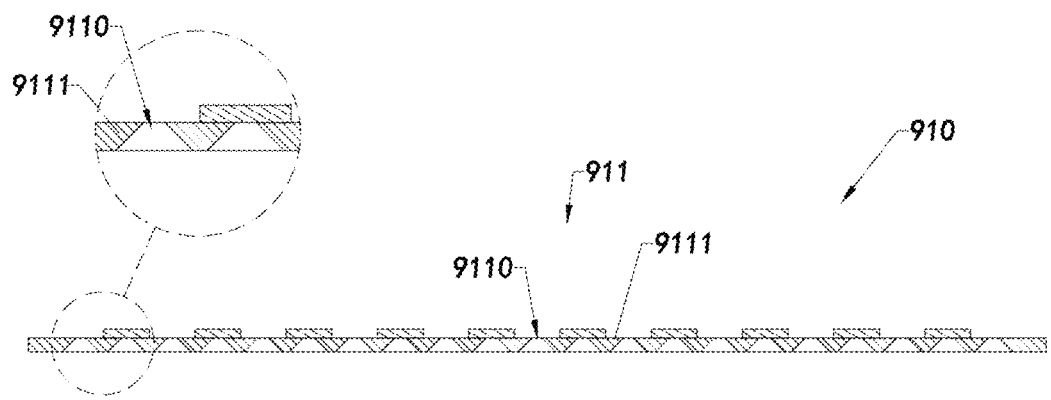
FIG. 6B is another schematic view of a plate structure of a support according to a preferred embodiment of the present disclosure.

Referring to FIG. 4, another embodiment of the electrode support 10 according to the above preferred embodiment of the present disclosure is shown.

The electrode support 10 includes multiple layers of support members 11, and each support member 11 includes a first partial support member 111 and a second partial support member 112. The first partial support member 111 and the second partial support member 112 are insulated from each other, and the first partial support member 111 is supported on the second partial support member 112. The first partial support member may be disposed above the second partial support member and disposed on the second partial support member.

The to-be-coated workpiece can be placed on the first partial support member 111 of the support member 11.

The first partial support member 111 is conductively coupled with the pulse power supply 31 as the cathode, and the second partial support member 112 is used as the gas supply part 70 for gas distribution.

The gas distribution opening 110 is formed on the second partial support member 112 towards the support member 11 in the next layer. When the to-be-coated workpiece is placed on the first partial support member 111 of the support member 11, the second partial support member 112 of the support member 11 in another layer is disposed above the to-be-coated workpiece.

The second partial support member 112 can form the gas path 1100, and the gas path 1100 is communicated with the gas distribution opening 110. When the gas leaves the second partial support member 112 from the gas distribution opening 110, at least part of the gas can be ionized to form the plasma under the action of the radio frequency electric field and/or the pulse electric field, and then the positive ions in the plasma can accelerate the movement towards the first partial support member 111 located below, so as to deposit on the surface of the to-be-coated workpiece supported on the first partial support member 111 of the support member 11.

Further, the second partial support member 112 can be conductively coupled with the radio frequency power supply 32, so that the gas can be ionized at the position of the second partial support member 112, and then accelerate the movement towards the to-be-coated workpiece under the action of the first partial support member 111 as the cathode.

In this way, in addition to the first layer of the support member 11, each layer of the support member 11 can be placed with the to-be-coated workpiece, which can increase the space utilization of the electrode support 10.

Further, the first partial support member 111 of each support member 11 can be conductively coupled with one connecting member 12 to facilitate conduction with the outside, and the second partial support member 112 of each support member 11 can be conductively coupled with another connecting member 12 to facilitate conduction with the outside. At the same time, the first partial support member 111 and the second partial support member 112 of each support member 11 are insulated from each other.

According to another aspect of the present disclosure, the present disclosure provides an operating method of the electrode support 10, which includes the following steps:

At least one layer of the support member 11 of the electrode support 10 is connected with the pulse power supply 31 to discharge around at least one to-be-coated workpiece to form the pulse electric field, and the support member 11 is used as the cathode of the pulse electric field.

According to some embodiments of the present disclosure, in the above method, the support member 11 and the pulse power supply 31 disposed outside the reaction chamber 20 are connected through at least one post supported on the support member 11, and the electrode support 10 is disposed in the reaction chamber body 20.

According to some embodiments of the present disclosure, the operating method of the electrode support 10 further includes the following steps:

At least one layer of the support member 11 of the electrode support 10 is connected with the pulse power supply 31 as the anode of the pulse power supply 31 to form the pulse electric field between the anode of the pulse power supply 31 and the cathode of the pulse power supply 31.

According to some embodiments of the present disclosure, the operating method of the electrode support 10 further includes the following steps:

At least one layer of the support member 11 of the electrode support 10 is connected with the radio frequency power supply 32 as the anode of the radio frequency power supply 32 to form the radio frequency electric field and the pulse electric field between the anode of the radio frequency power supply 32 and the cathode of the pulse power supply 31.

According to some embodiments of the present disclosure, the operating method of the electrode support 10 further includes the following steps:

providing the gas by at least one layer of the support member 11; and ionizing the gas to accelerate the movement towards the to-be-coated workpiece under the action of the cathode of the pulse power supply 31.

Referring to FIGS. 5 to 12, the present disclosure provides a support structure 911 and a support 910. The support 910 can be placed in a film coating apparatus 91, and the film coating apparatus 91 can be used to prepare various types of films, such as DLC films.

The film coating apparatus 91 can form the film layer by chemical deposition on the surface of the to-be-coated workpiece by using plasma enhanced chemical vapor deposition (PECVD). Specifically, the to-be-coated workpiece is placed in a reaction chamber body 920 of the film coating apparatus 91 for the plasma enhanced chemical vapor deposition, and the film layer is formed on the surface of the to-be-coated workpiece.

The plasma enhanced chemical vapor deposition (PECVD) process has many advantages over other existing deposition processes: (1) Dry deposition does not need to use organic solvents; (2) An etching effect of the plasma on the surface of the substrate makes a deposited film have good adhesion with the substrate; (3) The film can be deposited evenly on the surface of an irregular substrate with strong vapor permeability; (4) The coating has good designability, and compared with a micron control accuracy of a liquid phase method, the chemical vapor phase method can control a thickness of the coating in nano scale; (5) The coating has simple structure, the chemical vapor method uses plasma activation, and does not need to design a specific initiator to initiate composite coatings of different materials, and a variety of raw materials can be combined through adjusting input energy; (6) Good compactness can be achieved, and the chemical vapor deposition method often activates multiple active sites in a process of plasma initiation, which is similar to the condition in which a molecule has multiple functional groups in solution reaction, and a cross-linked structure is formed between molecular chains through multiple functional groups; (7) As a coating treatment technology, it has excellent universality and wide selection range of coating objects and raw materials used for coating.

Referring to FIGS. 5 to 6B and FIG. 12, specifically, the support 910 includes multiple layered support structures 911. The multiple layered support structures 911 are disposed in a reaction chamber 9200 of a reaction chamber body 920 of the film coating apparatus 91.

The to-be-coated workpiece can be placed in one or more layers of the multiple layered support structures 911 of the support 910.

The support 910 includes at least one connecting member 912, and the at least one connecting member 912 is disposed around the support structure 911 to support each support structure 911 at a preset height. A preset distance is maintained between adjacent support structures 911 for reactants to enter a space between adjacent support structures 911, so as to deposit on the surface of the to-be-coated workpiece supported on the support structure 911.

In some embodiments, the support structure 911 has a rectangular shape. It should be understood by those skilled in the art that the shape of the support structure 911 can be, but is not limited to, a triangle, a circle or other shapes. Optionally, the shape of the support structure 911 is similar to the shape of the cross section formed by an inner wall of the reaction chamber body 920. On the one hand, it is conducive to the utilization of the space of the reaction chamber 9200, on the other hand, it is conducive to an equal distance between the circumference of the support structure 911 and the inner wall of the reaction chamber body 920, so as to facilitate the uniformity of gas diffusion.

In some embodiments, there are four connecting members 912, which are respectively disposed at four corners of the support structure 911 to support the support structure 911. Further, the connecting members 912 can be implemented as a post, which can be standing on the reaction chamber body 920.

The support structure 911 can support a plurality of to-be-coated workpieces, and both the front and back sides of the to-be-coated workpiece placed on the support structure 911 can be coated in the film coating apparatus 91.

It should be noted that at least some of the support structures 911 can be used as an electrode, and at least some of the support structures 911 can play a supporting role. The support structures 911 used as the electrode and the support structures 911 playing the supporting role can be different or the same.

The support structure 911 has a plurality of gas vents 9110 and includes a plate body 9111. The plate body 9111 has a plate top surface and a plate bottom surface, and the plate top surface and the plate bottom surface are arranged opposite to each other. The to-be-coated workpiece can be placed on the plate top surface, and the gas vents 9110 pass through the plate top surface and the plate bottom surface from top to bottom so as to pass through the plate body 9111.

When the support structure 911 is supported on the connecting member 912 to be maintained in the reaction chamber 9200 of the reaction chamber body 920, the feed gas can diffuse throughout the whole support 910 through the gas vents 9110 of the support structure 911.

The gas vents 9110 can be formed in the plate body 9111 by punching, or the gas vents 9110 are formed in the process of an integral molding of the plate body 9111. The position and shape of the gas vents 9110 can be arranged as required. The gas vents 9110 can guide the flow of a feed gas, which will affect the final coating effect. The coating effect can be controlled by controlling the number and size of the gas vents 9110.

It can be understood that the feed gas can be a reaction gas. Different reaction gases can be selected based on different film requirements. For example, when the surface of the workpiece needs to be coated with a DLC film, the reaction gas can be CxHy, where x is an integer of 1 to 10 and Y is an integer of 1 to 20. The reaction gas can be a single gas or a mixed gas. Alternatively, the reaction gas may be methane, ethane, propane, butane, ethylene, acetylene, propylene, propyne in gaseous state under normal pressure, or vapor formed by decompression or heating evaporation. That is, the raw material that is liquid at room temperature can also be supplied to the reaction chamber 9200 in a gaseous state through a gas supply part 930.

The feed gas may be a plasma source gas, which includes but is not limited to inert gas, nitrogen and fluorocarbon compounds. For example, the inert gas includes but is not limited to helium or argon, and the fluorocarbon compounds includes but is not limited to carbon tetrafluoride. The plasma source gas can be a single gas or a mixture of two or more gases.

The feed gas can be an auxiliary gas, which can cooperate with the reaction gas to form a film layer to impart the film layer some expected characteristics, such as the strength and flexibility of the film layer. The auxiliary gas can be non-hydrocarbon gas, such as nitrogen, hydrogen, fluorocarbon gas, etc. The auxiliary gas can be supplied to the reaction chamber body 920 at the same time as the reaction gas, or can be introduced in order according to the demand. The addition of the auxiliary gas can adjust the proportion of elements in the film layer, the proportion of hydrocarbon bond, carbon nitrogen bond and nitrogen hydrogen bond, so as to change the properties of the film layer.

At least part of the feed gas can be diffused from the gas vents 9110 of the support structure 911. The position and size of the gas vents 9110 are specially arranged to facilitate the diffusion of the feed gas and the final coating effect.

In some embodiments, a diameter of the gas vents 9110 ranges from about 0.5 mm to 3 mm, and a distance between adjacent gas vents 9110 ranges from 60 mm to 90 mm.

A length and width of the support structure 911 ranges from 500 mm * 500 mm to 600 mm*600 mm, and a spacing between adjacent support structures 911 ranges from 10 mm~200 mm.

Further, the film coating apparatus 91 includes a discharge device 940, and the discharge device 940 includes a pulse power supply 941 and a radio frequency power supply 942. The pulse power supply 941 can provide a pulse electric field, the radio frequency power supply 942 can provide a radio frequency electric field, and the radio frequency power supply 942 can be loaded on the electrode plate to generate the radio frequency electric field. Alternatively, the radio frequency power supply 942 is disposed outside the chamber as an inductive coupling plasma power supply to provide an alternating magnetic field. The pulse power supply 941 and the radio frequency power supply 942 can be used separately or jointly.

It should be noted that in the PECVD process, due to the low energy of the radio frequency power supply 942 itself, the effect of using the radio frequency power supply 942 alone to generate the plasma in industrial mass production is not ideal. With an expansion of the reaction chamber body 920 of the film coating apparatus 91 and an increase of the number of the to-be-coated workpieces, adverse effects such as uneven coating appear.

Pulse discharge is also a common method in the plasma chemical vapor deposition (PECVD) process. The energy of the pulse discharge is high. With the expansion of the reaction chamber body 920 of the film coating apparatus 91 and the increase of the number of to-be-coated workpieces, the voltage requirements for the pulse power supply 941 are higher to enhance a processing capacity. However, the pulse power supply 941 with higher voltage may produce stronger bombardment on the surface of the to-be-coated workpiece, which may damage the surface of the to-be-coated workpiece.

In some embodiments, the pulse power supply 941 and the radio frequency power supply 942 can be used at the same time, which increases the energy when the plasma reaches the surface of the to-be-coated workpiece to obtain a dense film layer, on the basis of obtaining the plasma with a high ionization rate.

Further, the support 910 is provided with at least one insulating member 913. The insulating member 913 is made of an insulating material, such as polytetrafluoroethylene. The insulating member 913 is disposed at a bottom end of the connecting member 912. When the entire support 910 is accommodated in the reaction chamber body 920, the insulating member 913 can be supported on the reaction chamber body 920 so that the support 910 cannot be conductively coupled with the reaction chamber body 920.

The entire support 910 is conductively coupled with the discharge device 940 as a cathode, and the reaction chamber body 920 may be grounded or conductively coupled with the discharge device 940 as an anode.

For example, the support 910 can be conductively coupled with the pulse power supply 941 of the discharge device 940 as a cathode of the pulse power supply 941, at least part of the reaction chamber body 920 can be conductively coupled with the pulse power supply 941 of the discharge device 940 as an anode of the pulse power supply 941, and the reaction chamber body 920 can be grounded.

The radio frequency power supply 942 may be independent of the support 910, or at least one of the support structures 911 of the support 910 may be conductively coupled with the radio frequency power supply 942.

The to-be-coated workpiece is placed on the support structure 911 as the cathode, so that the positive ions in the plasma can accelerate the movement towards the support structure 911 as the cathode under the action of electric field, and then form a dense film layer on the surface of the to-be-coated workpiece.

In this process, the feed gas can diffuse through the gas vents 9110 at a preset position of the support structure 911.

For example, the feed gas diffuses through the gas vents 9110 of the support structure 911 of the second layer, so as to enter a space between the support structure 911 of the second layer and the support structure 911 of the third layer. At the same time, the feed gas between the support structure 911 of the second layer and the support structure 911 of the third layer can be diffused through the gas vents 9110 of the support structure 911 of the third layer or through the gas vents 9110 of the support structure 911 of the second layer.

It should be noted that the to-be-coated workpiece has a front and a back. The to-be-coated workpiece is supported on the support structure 911 with the front facing upwards.

The feed gas can deposit on the back of the to-be-coated workpiece through a gap between the to-be-coated workpiece and the support structure 911. Since at least part of the back of the to-be-coated workpiece is exposed to the gas vents 9110 of the support structure 911, at least part of the feed gas can pass through the gas vents 9110 from top to bottom and then deposit on the back of the to-be-coated workpiece, so that the front and back of the to-be-coated workpiece can be coated at the same time.

Further, it should be noted that in some embodiments, the support structure 911 is disposed at various height positions of the reaction chamber 9200 of the reaction chamber body 920 through the connecting member 912.

Figure 13:
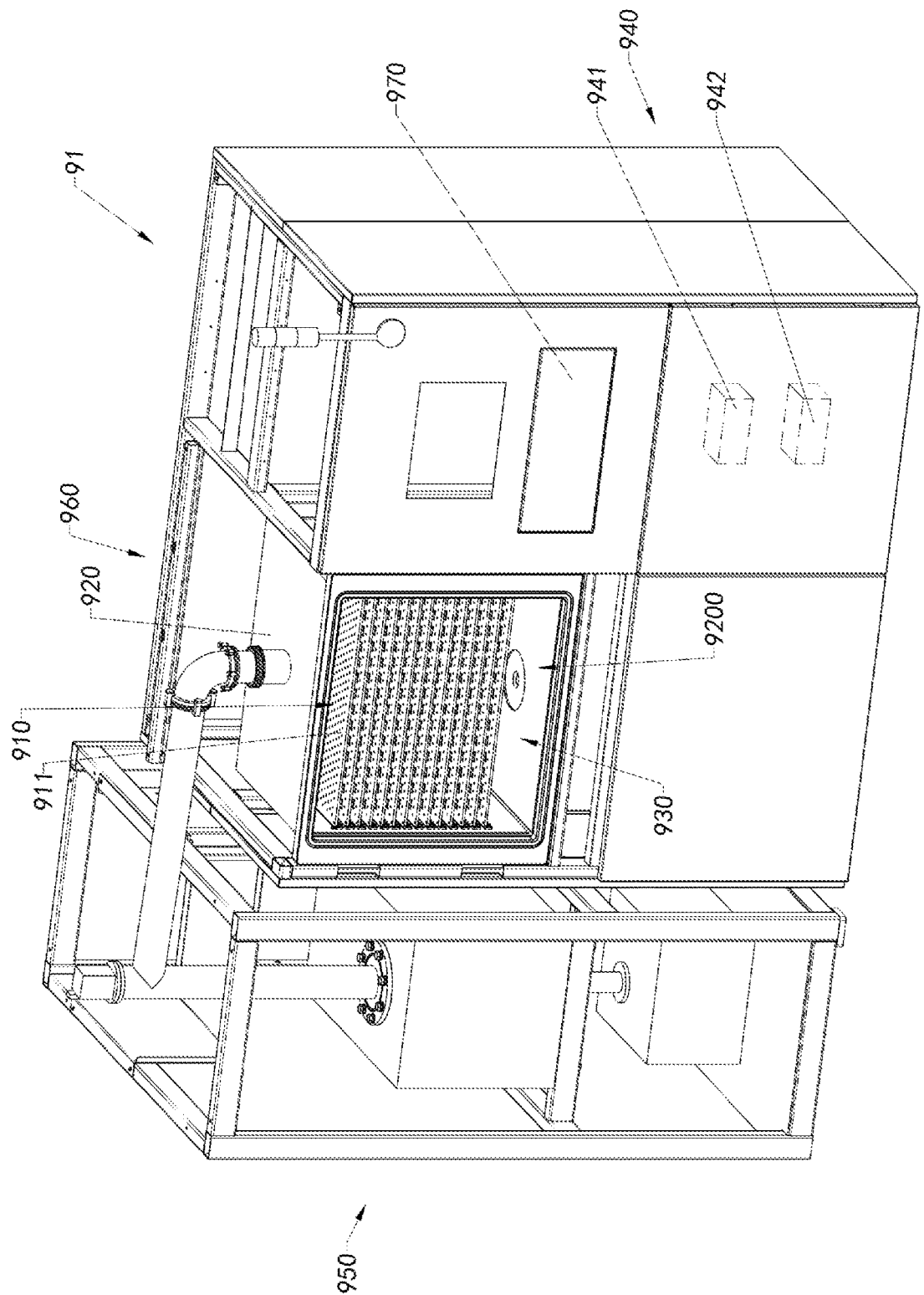
FIG. 13 is a schematic view of the film coating apparatus according to another preferred embodiment of the present disclosure.

In other embodiments of the present disclosure, the support structure 911 can be directly installed in the reaction chamber body 920. For example, referring to FIG. 13, the support structure 911 can be detachably installed in the reaction chamber body 920, for example, in a clamping manner, and the reaction chamber body 920 can be provided with a groove. The support structure 911 can be installed in the reaction chamber body 920 in a horizontal manner or in a vertical manner.

Further, it should be noted that in some embodiments, each of the support structures 911 can be made of a conductive material, such as stainless steel, and at least one connecting member 912 can also be made of a conductive material. The conductive support structures 911 are respectively conductively coupled with the conductive connecting member 912, so that the conduction between each support structure 911 and the outside can be realized through the conduction between the connecting member 912 and the outside.

In this way, tedious steps of wiring each support structure 911 to connect with the outside are omitted, and the discharge control of the support 910 is also convenient.

Figure 7:
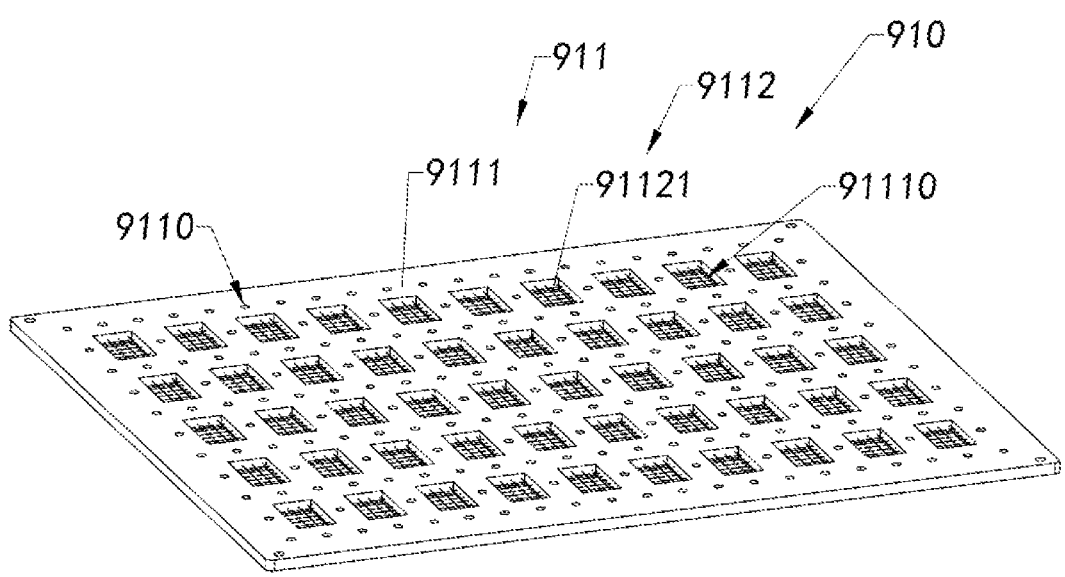
FIG. 7 is a schematic view of a plate structure of a support according to another preferred embodiment of the present disclosure.

Referring to FIG. 7, another embodiment of the support structure 911 according to the present disclosure is illustrated.

Specifically, the support structure 911 includes a plate body 9111 and at least one supporting member 9112. The supporting member 9112 can also be referred to as an electrode member 9112, and the electrode member 9112 is disposed on the plate body 9111. The electrode member 9112 is conductively coupled with the discharge device 940 of the film coating apparatus 91 to discharge as an electrode. The plate body 9111 can support the to-be-coated workpiece.

The electrode member 9112 includes a plurality of electrode elements 91121 and has a plurality of gas vents 9110, and the electrode elements 91121 are disposed alternately to form the gas vents 9110.

Specifically, the plate body 9111 forms a plurality of accommodation spaces 91110, and the accommodation spaces 91110 can be formed by drilling, or the plate body 9111 forms the accommodation spaces 91110 in the process of integral molding.

The electrode elements 91121 may be disposed in the accommodation spaces 91110 and connected with the plate body 9111. In detail, the electrode elements 91121 are disposed alternately across the accommodation spaces 91110 so that the to-be-coated workpiece can be supported on the electrode elements 91121 and maintained in the accommodation spaces 91110.

It can be understood that in other embodiments of the present disclosure, the to-be-coated workpiece can be supported on the plate body 9111 so that the plate body 9111 plays a supporting role, and the electrode elements 9112 play a discharge role, which are independent of each other.

Each accommodation space 91110 can accommodate at least one to-be-coated workpiece. With the plate body 9111, adjacent to-be-coated workpieces can be separated to keep each to-be-coated workpiece in a relatively independent space.

The feed gas can pass through the accommodation spaces 91110 from top to bottom or from bottom to top, and then pass through the gas vents 9110 to diffuse through the layers, so that the to-be-coated workpiece supported by the supporting member 9112 and kept in the accommodation spaces 91110 can be coated.

Certainly, it can be understood that the to-be-coated workpiece can also be placed at the position of the plate body 9111, and the position of the supporting member 9112 can only serve as a passage of the feed gas.

The supporting member 9112 can be made of a conductive material. When the to-be-coated workpiece is placed on the supporting member 9112, the supporting member 9112 can be conductively coupled with the discharge device 940 as the cathode. The plate body 9111 can be made of a conductive material or an insulating material. When the plate body 9111 is made of an insulating material, the formation of the electric field around the to-be-coated workpiece depends on the supporting member 9112. The plate body 9111 can shield adjacent accommodation spaces 91110.

Figure 8:
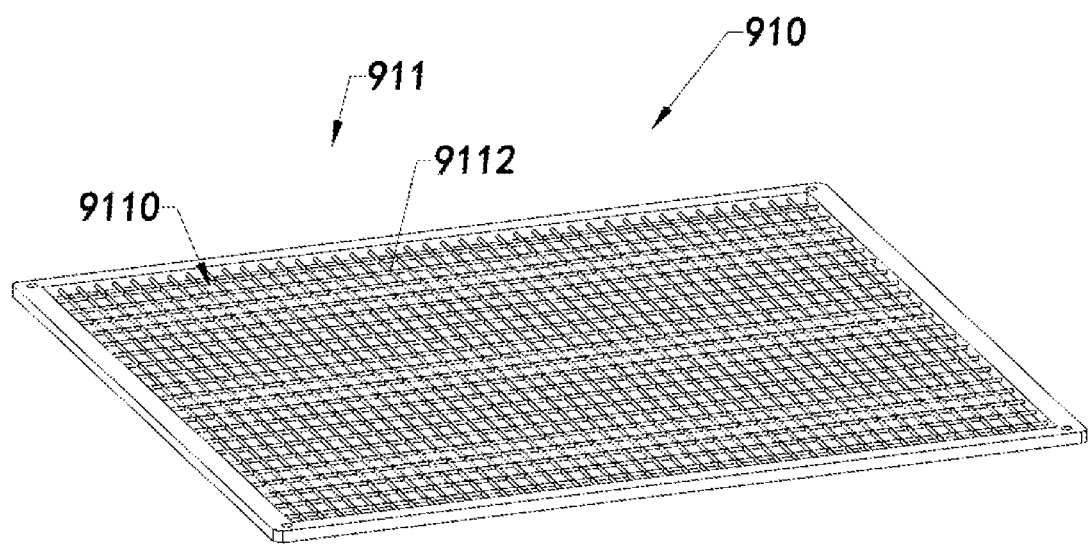
FIG. 8 is a schematic view of a plate structure of a support according to another preferred embodiment of the present disclosure.

Referring to FIG. 8, another embodiment of the support structure 911 according to the present disclosure is illustrated.

In some embodiments, the support structure 911 includes a plurality of support members 9112, and the supporting members 9112 are disposed alternatively to form the gas vents 9110.

The to-be-coated workpiece is supported on the supporting members 9112. In some embodiments, the support structure 911 has a mesh structure.

For the to-be-coated workpiece, the support structures 911 contacting the back of the to-be-coated workpiece are reduced to facilitate the back of the to-be-coated workpiece to be exposed to the feed gas, thereby facilitating the coating of the back of the to-be-coated workpiece.

For the whole support 910, the weight of the support 910 can be reduced, which is conducive to the lightweight of the entire film coating apparatus 91. It should be noted that when the entire support 910 can be removed from the reaction chamber 9200 of the reaction chamber body 920, the lighter support 910 is obviously more conducive to this operation.

Further, in other embodiments of the present disclosure, the above three different types of support structures 911 can be disposed alternately according to requirements. For example, a plate structure and a plate-mesh structure are disposed alternately, a plate structure and a mesh structure are disposed alternately, or a plate-mesh structure and a mesh structure are disposed alternately.

Figure 9:
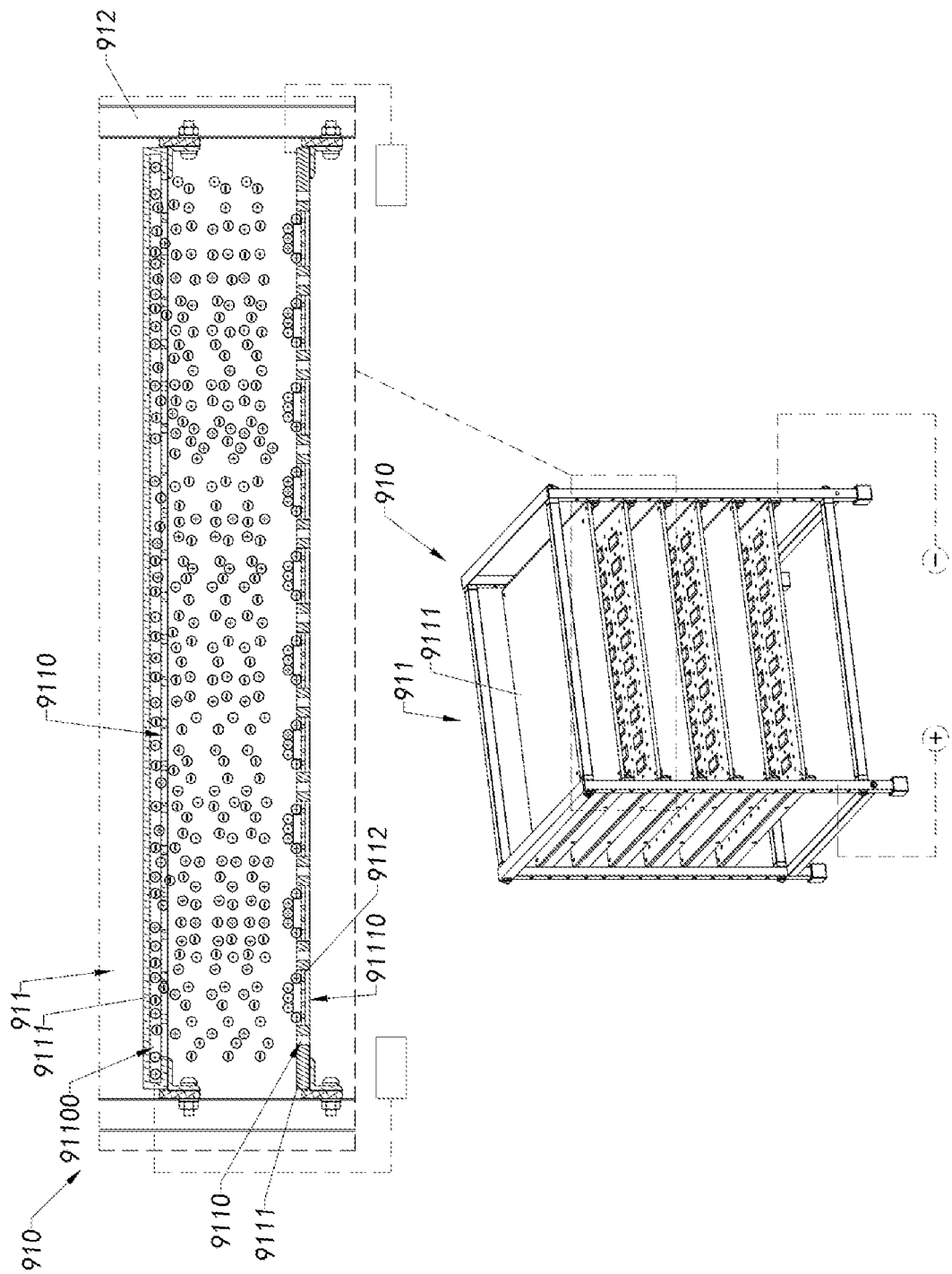
FIG. 9 is a schematic view of a support according to another preferred embodiment of the present disclosure.
Figure 10A:
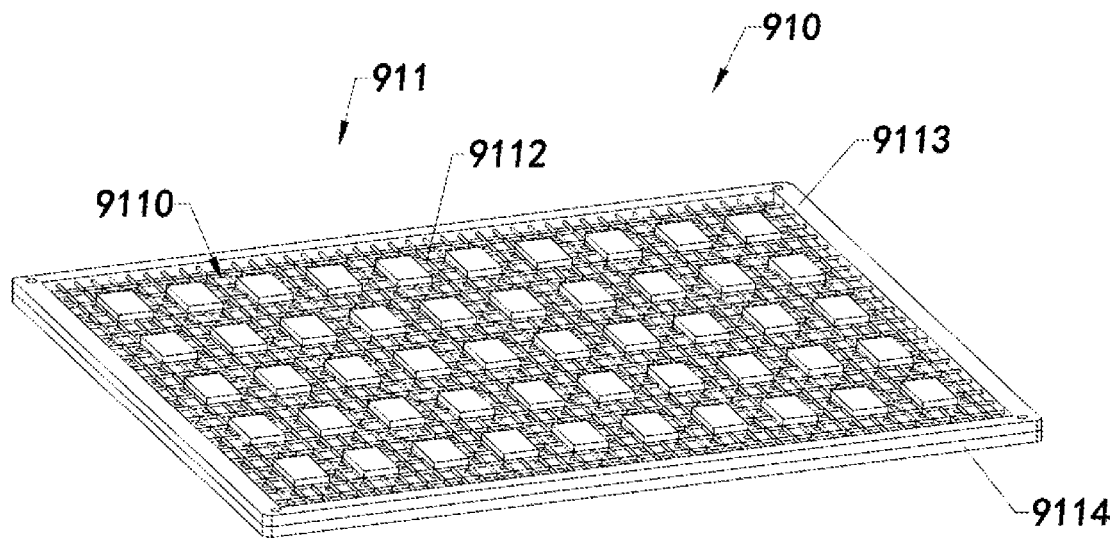
FIG. 10A is a schematic view of a plate structure of a support according to a preferred embodiment of the present disclosure.
Figure 10B:
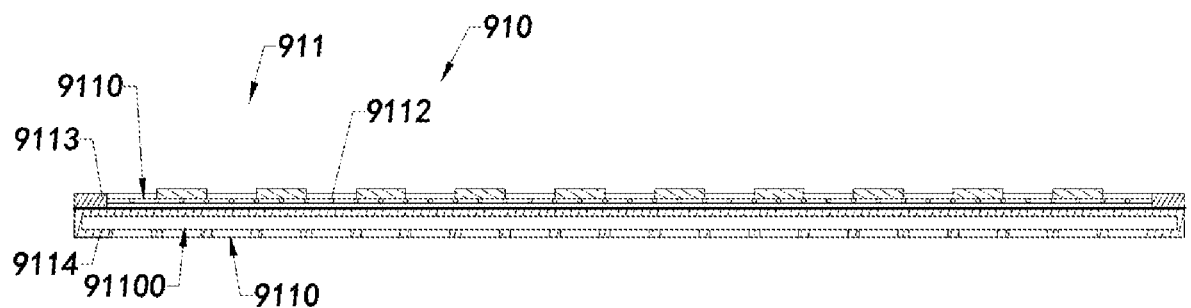
FIG. 10B is a schematic view of a plate structure of a support according to another preferred embodiment of the present disclosure.
Figure 11A:
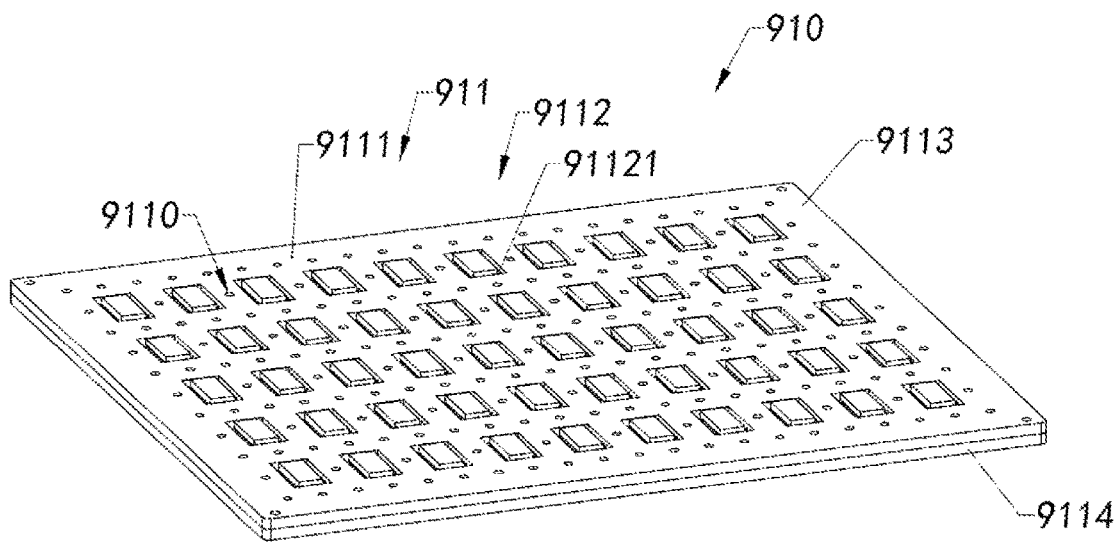
FIG. 11A is a schematic view of a plate structure of a support according to another preferred embodiment of the present disclosure.
Figure 11B:
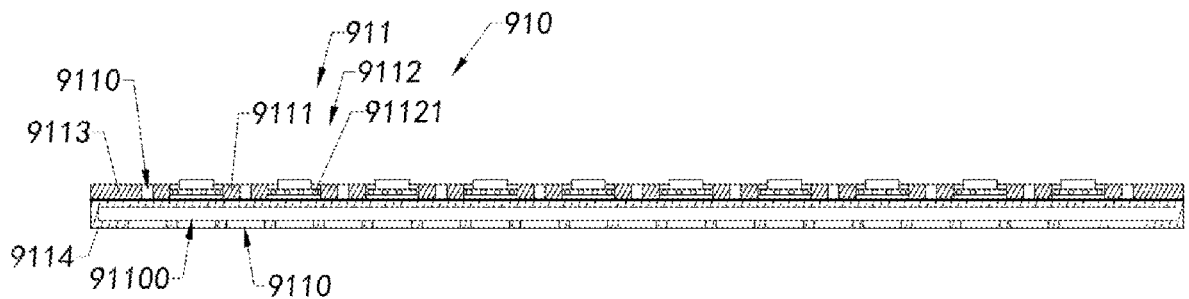
FIG. 11B is a schematic view of a plate structure of a support according to another preferred embodiment of the present disclosure.
Figure 12:
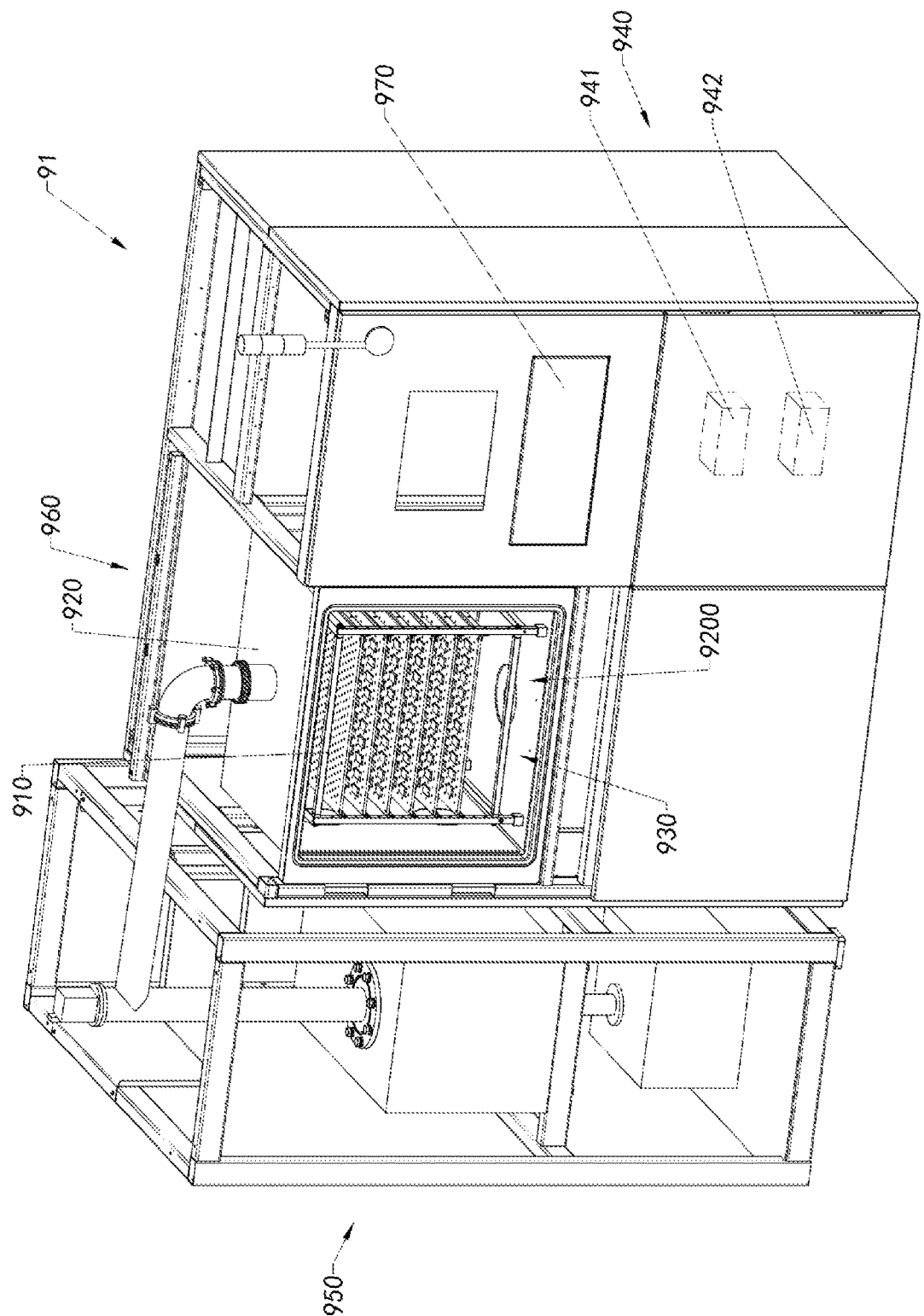
FIG. 12 is a schematic view of a film coating apparatus according to a preferred embodiment of the present disclosure.

Referring to FIGS. 9 and 12, another embodiment of the support 910 according to the present disclosure is illustrated.

In some embodiments, the support 910 includes two different types of support structures 911. Specifically, at least one of the support structures 911 includes the plate body 9111, and at least one of the support structures 911 includes the plate body 9111 and the plurality of supporting members 9112. That is, at least one of the plurality of support structures 911 has a plate structure, and at least one of the plurality of support structures 911 has a plate-mesh structure.

The support structures 911 having the plate structure and the plate-mesh structure are disposed alternately. For example, the support structure 911 of the first layer can have the plate structure, the support structure 911 of the second layer can have the plate-mesh structure, and the support structure 911 of the third layer can have the plate structure.

The film coating apparatus 91 further includes a gas supply part 930, and the gas supply part 930 can supply a feed gas. The support structure 911 can form at least part of the gas supply part 930.

Specifically, at least one of the support structures 911 has at least one gas transmission path 91100, and the gas transmission path 91100 is communicated with the gas vents 9110. The gas vents 9110 can pass through the plate body 9111 so that the gas from the gas transmission path 91100 can diffuse towards an upper and lower sides of the support structure 911 respectively.

The gas vents 9110 may also be formed on one side of the plate body 9111 so that the gas from the gas transmission path 91100 can diffuse towards one side of the support structure 911.

In some embodiments, the gas vents 9110 are disposed towards the support structure 911 of the next layer.

The support structure 911 having the plate-mesh structure is conductively coupled with the pulse power supply 941 of the discharge device 940 as a cathode of the pulse power supply 941. The to-be-coated workpiece can be placed on the support structure 911 having the plate-mesh structure.

The support structure 911 having the plate structure can be conductively coupled with the pulse power supply 941 of the discharge device 940 as an anode of the pulse power supply 941. In other embodiments of the present disclosure, the support structure 911 having the plate structure can be conductively coupled with the radio frequency power supply 942 of the discharge device 940 as an anode of the radio frequency power supply 942. In other embodiments of the present disclosure, the support structure 911 having the plate structure can be directly grounded.

When the to-be-coated workpiece is placed on the support structure 911 having the plate-mesh structure, the support structure 911 having the plate structure is disposed above the to-be-coated workpiece, and the feed gas can diffuse from above the to-be-coated workpiece through the gas vents 9110 disposed above the to-be-coated workpiece. For example, the gas from the support structure 911 of the first layer diffuses between the support structure 911 of the first layer and the support structure 911 of the second layer. Since the support structure 911 of the second layer is used as a negative electrode, the positive ions in the plasma generated under the action of the electric field can accelerate the movement towards the support structure 911 of the second layer, and deposit on the front of the to-be-coated workpiece supported on the support structure 911 of the second layer.

It should be noted that since the to-be-coated workpiece is supported on the support structure 911 having the plate-mesh structure, the feed gas or reaction gas can pass through the gas vents 9110 formed by the alternate supporting members 9112 of the support structure 911, and the to-be-coated workpiece is supported on the supporting members 9112, so that the gas can be distributed around a peripheral side of the to-be-coated workpiece, which is conducive to the coating of the back of the to-be-coated workpiece.

Further, in the present embodiment, there are four connecting members 912, the support structure 911 has a rectangular structure, and the four connecting members 912 are respectively disposed at four corners of each support structure 911.

Optionally, each of the support structures 911 is disposed in the same way along a height direction of the connecting member 912. For example, the four corners of the support structure 911 of the first layer correspond to the four corners of the support structure 911 of the second layer. The projection of each layer of support structure 911 in the height direction is located at a same position.

Further, each support structure 911 as the cathode is conductively coupled with one connecting member 912, and each support structure 911 as the anode is conductively coupled with another connecting member 912. In this way, each of the support structures 911 as the cathode can be conductively coupled with the external pulse power supply 941 through one connecting member 912. Each support structure as the anode can be conductively coupled with the external pulse power supply 941 through another connecting member 912.

In other embodiments of the present disclosure, except the support structures 911 as the cathode, remaining support structures 911 can be connected with the external radio frequency power supply 942 through another connecting member or directly grounded.

In other embodiments of the present disclosure, the support structures 911 having the plate-mesh structure and the support structures 911 having the mesh structure can be disposed alternately.

In other embodiments of the present disclosure, the support structures 911 having the plate structure and the support structures 911 having the mesh structure can be arranged alternately.

Another embodiment of the support according to the present disclosure is illustrated with reference to FIGS. 10A and 10B and FIGS. 5 and 12. In some embodiments, each support structure 911 includes a first support part 9113 and a second support part 9114. The first support part 9113 is supported on the second support part 9114, the first support part 9113 is used to support the to-be-coated workpiece, and the second support part 9114 is used for gas distribution.

Specifically, the first support part 9113 includes a plurality of supporting members 9112 disposed alternately to form the gas vents 9110.

The second support part 9114 includes the plate body 9111 and has a plurality of gas vents 9110, and the gas vents 9110 are formed in the plate body 9111. The plate body 9111 is formed with at least one gas transmission path 91100, and the gas vents 9110 are communicated with the gas transmission path 91100.

The gas vents 9110 are formed in the second support part 9114 towards a next layer of support structure. When the to-be-coated workpiece is placed on the first support part 9113 of the support structure 911, the second support part 9114 of the support structure 911 of another layer is located above the to-be-coated workpiece.

When the gas leaves the second support part 9114 from the gas vents 9110, at least part of the gas can be ionized to form the plasma under the action of the radio frequency electric field and/or the pulse electric field, and then the positive ions in the plasma can accelerate towards the first support part 9113 located below, so as to deposit on the surface of the to-be-coated workpiece supported on the first support part 9113 of the support structure 911.

Further, the second support part 9114 can be conductively coupled with the radio frequency power supply 942, so that the gas can be ionized at the position of the second support part 9114, and then accelerate the movement towards the to-be-coated workpiece under the action of the first support part 9113 as a cathode.

In this way, except the support structure 911 of the first layer, each layer of support structure 911 can be placed with the to-be-coated workpiece to increase the space utilization of the support 910.

Further, the first support part 9113 of each support structure 911 can be conductively coupled with one connecting member 912 so as to be conveniently connected with the outside, and the second support part 9114 of each support structure 911 can be conductively coupled with another connecting member 912 so as to be conveniently connected with the outside. At the same time, the first support part 9113 and the second support part 9114 of each support structure 911 are insulated from each other.

With reference to FIGS. 11A and 11B and FIGS. 5 and 12, another embodiment of the support 910 according to the present disclosure is illustrated. In some embodiments, the support structure 911 includes a first support part 9113 and a second support part 9114. The first support part 9113 is supported on the second support part 9114, the first support part 9113 is used to support the to-be-coated workpiece, and the second support part 9114 is used for gas distribution.

Specifically, the first support part 9113 includes a plurality of plate bodies 9111 and a plurality of supporting members 9112 (or electrode members 9112). The supporting member 9112 (or the electrode members 9112) alternately forms the gas vents 9110, or the plate bodies 9111 and the supporting members 9112 (or the electrode member 9112) alternately form the gas vents 110.

The plate bodies 9111 form a plurality of accommodation spaces 91110, and the accommodation spaces 91110 can be formed by drilling, or the plate body 9111 forms the accommodation spaces 91110 in the process of integral molding.

The electrode members 91121 may be disposed in the accommodation spaces 91110 and connected with the plate bodies 9111. In detail, the electrode members 91121 are disposed alternately across the accommodation spaces 91110 so that the to-be-coated workpiece can be supported on the electrode members 91121 and maintained in the accommodation spaces 91110.

Each accommodation space 91110 can accommodate at least one to-be-coated workpiece. With the plate bodies 9111, adjacent to-be-coated workpieces can be separated to keep each to-be-coated workpiece in a relatively independent space.

The second support part 9114 includes a plate body 9111 and has a plurality of gas vents 9110, and the gas vents 9110 are formed in the plate body 9111. The plate body 9111 is formed with at least one gas transmission path 91100, and the gas vents 9110 are communicated with the gas transmission path 91100.

The gas vents 9110 are formed in the second support part 9114 towards the next layer of support structure 911. When the to-be-coated workpiece is placed on the first support part 9113 of the support structure 911, the second support part 9114 of another layer of support structure 911 is located above the to-be-coated workpiece.

When the gas leaves the second support part 9114 from the gas vents 9110, at least part of the gas can be ionized to form the plasma under the action of the radio frequency electric field and/or the pulse electric field, and then the positive ions in the plasma can accelerate towards the first support part 9113 located below, so as to deposit on the surface of the to-be-coated workpiece supported on the first support part 9113 of the support structure 911.

Further, the second support part 9114 can be conductively coupled with the radio frequency power supply 942, so that the gas can be ionized at the position of the second support part 9114, and then accelerate the movement towards the to-be-coated workpiece under the action of the first support part 9113 as the cathode.

In this way, except the support structure 911 of the first layer, each layer of support structure 911 can be placed with the to-be-coated workpiece to increase the space utilization of the support 910.

Further, the first support part 9113 of each support structure 911 can be conductively coupled with one connecting member 912 to facilitate conduction with the outside, and the second support part 9114 of each support structure 911 can be conductively coupled with another connecting member 912 to facilitate conduction with the outside. At the same time, the first support part 9113 and the second support part 9114 of each support structure 911 are insulated from each other.

Further, as shown in FIG. 12, the film coating apparatus 91 further includes a suction device 950, a feeding device 960 and a control device 970. The suction device 950 and the feeding device 960 are respectively connected with the reaction chamber body 920, and the suction device 950, the feeding device 960 and the discharge device 940 are respectively connected with the control device 970. The suction device 950 is used to suction gas to change the vacuum degree in the reaction chamber body 920. The control device 970 is used to control a feed flow rate, a proportion, a pressure, a discharge size, a discharge frequency and other parameters in the reaction chamber body 920 so as to make the whole coating process controllable.

According to another aspect of the present disclosure, the present disclosure provides an operating method of the support 910, including the following steps:

At least one layer of the support member 911 of the electrode support 910 is connected with the pulse power supply 941 to discharge around at least one to-be-coated workpiece to form the pulse electric field, and the support member 911 is used as the cathode of the pulse electric field.

According to some embodiments of the present disclosure, in the above method, the support member 911 and the pulse power supply 941 disposed outside the reaction chamber body 920 are connected through at least one post supported on the support member 911, and the electrode support 910 is disposed in the reaction chamber body 920.

According to some embodiments of the present disclosure, the operating method of the electrode support 910 further includes the following steps:

At least one layer of the support member 911 of the electrode support 910 is connected with the pulse power supply 941 as the anode of the pulse power supply 941 to form the pulse electric field between the anode of the pulse power supply 941 and the cathode of the pulse power supply 941.

According to some embodiments of the present disclosure, the operating method of the electrode support 910 further includes the following steps:

At least one layer of the support member 911 of the electrode support 910 is conductively coupled with the radio frequency power supply 942 as the anode of the radio frequency power supply 942 to form the radio frequency electric field and the pulse electric field between the anode of the radio frequency power supply 942 and the cathode of the pulse power supply 941.

According to some embodiments of the present disclosure, the operating method of the support 910 further includes the following steps:

Releasing the gas by at least one layer of the support member 911;

Ionizing the gas to accelerate the movement towards the to-be-coated workpiece under the action of the cathode of the pulse power supply 941.

It will be appreciated by those skilled in the art that the embodiments of the present disclosure described above and shown in the accompanying drawings are illustrative only and do not limit the present disclosure. The objects of the present disclosure have been completely and effectively realized. The function and structural principle of the present disclosure have been shown and explained in the embodiments, and any variations or modifications of the embodiments of the present disclosure are possible without departing from the principles described.

The invention claimed is:

1. An electrode support, configured for a film coating apparatus for forming coating on at least one to-be-coated workpiece, wherein the film coating apparatus comprises a reaction chamber body and a pulse power supply, and the pulse power supply is configured to provide a pulse electric field in the reaction chamber body; and wherein the electrode support comprises a plurality of support members disposed in multiple layers and spaced apart by a preset spacing, and at least one layer of support member of the plurality of support members disposed in multiple layers_is conductively coupled with the pulse power supply as a cathode of the pulse power supply;

wherein at least one layer of support member of the plurality of support members disposed in multiple layers comprises a support top plate and a support bottom plate, there is a space between the support top plate and the support bottom plate, and the support bottom plate has at least one gas distribution opening, wherein the film coating apparatus comprises a gas supply part, and at least one support member forms at least part of the gas supply part, wherein the gas supply part is disposed on the plurality of support members as an anode of the pulse power supply, and the at least one gas distribution opening is evenly disposed on the plurality of support members as the anode of the pulse power supply towards a next layer of the support member of the plurality of support members disposed in multiple layers; or at least one layer of support member of the plurality of support members disposed in multiple layers comprises a first partial support member and a second partial support member, the first partial support member is disposed above the second partial support member and disposed on the second partial support member, and the first partial support member is conductively coupled with the pulse power supply as the cathode, wherein the second partial support member is used as the gas supply part for gas distribution.

2. The electrode support according to claim 1, wherein at least one layer of support member of the plurality of support members disposed in multiple layers_is conductively coupled with the pulse power supply as an anode of the pulse power supply.

3. The electrode support according to claim 2, wherein the support member as the cathode of the pulse power supply is disposed below the support member as the anode of the pulse power supply, and the to-be-coated workpiece is disposed on the support member as the cathode of the pulse power supply.

4. The electrode support according to claim 2, wherein the support member as the cathode of the pulse power supply and the support member as the anode of the pulse power supply are disposed alternately.

5. The electrode support according to claim 1, wherein another layer of support member of the plurality of support members disposed in multiple layers disposed below the support member as the gas supply part is conductively coupled with the pulse power supply as the cathode of the pulse power supply.

6. The electrode support according to claim 1, wherein the support member as the gas supply part is conductively coupled with a radio frequency power supply of the film coating apparatus.

7. The electrode support according to claim 1, wherein the second partial support member has at least one gas transmission path and at least one gas distribution opening, the gas distribution opening is communicated with the gas transmission path, and the gas distribution opening is disposed towards the first partial support member of a next layer of the support member of the plurality of support members disposed in multiple layers.

8. The electrode support according to claim 7, wherein the second partial support member is insulated from the first partial support member.

9. The electrode support according to claim 1, further comprising at least one post, wherein each of the plurality of support members are supported on the post at intervals.

10. The electrode support according to claim 9, wherein at least one support member is conductively coupled with the post and is conductively coupled with the pulse power supply outside the reaction chamber body through the post.

11. The electrode support according to claim 9, wherein distances between two adjacent support members of the plurality of support members disposed in multiple layers supported on the post are the same.

12. The electrode support according to claim 9, further comprising at least one insulating member, wherein the at least one insulating member is disposed at a bottom end of the post to insulate the electrode support from the reaction chamber body.

13. The electrode support according to claim 9, wherein the support members of the plurality of support members disposed in multiple layers and the post are made of stainless steel.

14. The electrode support according to claim 1, wherein distances between two adjacent support members of the plurality of support members disposed in multiple layers range from 10 mm to 200 mm.

* * * * *